US012619189B2

(12) United States Patent
Yuzawa

(10) Patent No.: US 12,619,189 B2
(45) **Date of Patent: *May 5, 2026**

(54) IMAGE FORMING APPARATUS WITH A CASING INCLUDING PARTICULARLY ARRANGED FRAMES AND COVERS

(71) Applicant: CANON KABUSHIKI KAISHA, Tokyo (JP)

(72) Inventor: Atsuyuki Yuzawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/765,434

(22) Filed: Jul. 8, 2024

(65) Prior Publication Data

US 2024/0361722 A1 Oct. 31, 2024

Related U.S. Application Data

(63) Continuation of application No. 18/060,700, filed on Dec. 1, 2022, now Pat. No. 12,055,884.

(30) Foreign Application Priority Data

Dec. 9, 2021 (JP) ................................ 2021-199698
Oct. 4, 2022 (JP) ................................ 2022-160180

(51) Int. Cl.
*G03G 21/16* (2006.01)

(52) U.S. Cl.
CPC ..... *G03G 21/1619* (2013.01); *G03G 21/1633* (2013.01)

(58) Field of Classification Search
CPC ....................... G03G 21/1619; G03G 21/1633
See application file for complete search history.

(56) References Cited

U.S. PATENT DOCUMENTS 7,826,753 B2 11/2010 Watanabe
12,055,884 B2 * 8/2024 Yuzawa ............ G03G 21/1619
(Continued)

FOREIGN PATENT DOCUMENTS

JP H02289861 A 11/1990
JP 2003069243 A 3/2003
(Continued)

OTHER PUBLICATIONS

Quayle Office Action issued in U.S. Appl. No. 18/060,700, mailed Dec. 13, 2023.
(Continued)

*Primary Examiner* — Sandra Brase
(74) *Attorney, Agent, or Firm* — ROSSI, KIMMS & McDOWELL LLP

(57) ABSTRACT

An image forming apparatus includes an image forming unit including an image bearing member, and a casing on which a discharge port is formed, the casing including a first frame, a second frame disposed below the first frame in a vertical direction, a side cover, and a top cover, the first frame including a side plate that supports an end, in a longitudinal direction, of the image bearing member. At least one of the top cover and the first frame includes a first pillar portion. The second frame includes a second pillar portion. The side cover includes a third pillar portion disposed between the first pillar portion and the second pillar portion in the vertical direction, the third pillar portion being provided at a position at least partially overlapping with the first pillar portion and the second pillar portion when viewed in the vertical direction.

30 Claims, 29 Drawing Sheets

(56) References Cited

U.S. PATENT DOCUMENTS

| | | | |
|---|---|---|---|
| 2016/0187838 | A1 | 6/2016 | Onishi |
| 2021/0278781 | A1 | 9/2021 | Takagi |

FOREIGN PATENT DOCUMENTS

| | | | |
|---|---|---|---|
| JP | 2003084517 | A | 3/2003 |
| JP | 2008009293 | A | 1/2008 |

OTHER PUBLICATIONS

Notice of Allowance issued in U.S. Appl. No. 18/060,700, mailed Apr. 10, 2024.

* cited by examiner

IMAGE FORMING APPARATUS WITH A CASING INCLUDING PARTICULARLY ARRANGED FRAMES AND COVERS

BACKGROUND OF THE INVENTION

Field of the Invention

The present invention relates to an image forming apparatus that forms an image on a sheet.

Description of the Related Art

Japanese Patent Application Laid-Open No. 2003-84517 proposes an image forming apparatus in which a structure of an image forming unit is formed by a mold frame, and the mold frame is supported by a metal bottom plate forming a bottom surface of an image forming apparatus body excluding a sheet feeding cassette portion. The image forming apparatus includes three pillars made of sheet metal erected at three corners of the bottom plate, a box-shaped side plate provided at the remaining one corner, and a document reading unit supported by the three pillars and the side plate.

However, in the image forming apparatus described in Japanese Patent Application Laid-Open No. 2003-84517, the weights of the three pillars and the side plate forming the frame of the image forming apparatus are heavy, and the image forming apparatus is heavy.

SUMMARY OF THE INVENTION

According to one aspect of the present invention, an image forming apparatus includes an image forming unit including an image bearing member which bears an image, the image forming unit being configured to form the image on a sheet, and a casing in which the image forming unit is accommodated and on which a discharge port is formed, the discharge port being configured to discharge the sheet on which the image is formed by the image forming unit, the casing including a first frame, a second frame disposed below the first frame in a vertical direction, a side cover forming one side surface of the casing, and a top cover forming a top surface of the casing, the first frame including a side plate that supports an end, in a longitudinal direction, of the image bearing member. At least one of the top cover and the first frame includes a first pillar portion. The second frame includes a second pillar portion disposed below the first pillar portion. The side cover includes a third pillar portion disposed between the first pillar portion and the second pillar portion in the vertical direction, the third pillar portion being configured to come into contact with the first pillar portion and the second pillar portion in the vertical direction, the third pillar portion being provided at a position at least partially overlapping with the first pillar portion and the second pillar portion when viewed in the vertical direction.

Further features of the present invention will become apparent from the following description of exemplary embodiments with reference to the attached drawings.

DESCRIPTION OF THE EMBODIMENTS

First Exemplary Embodiment

Overall Configuration

Figure 1A:
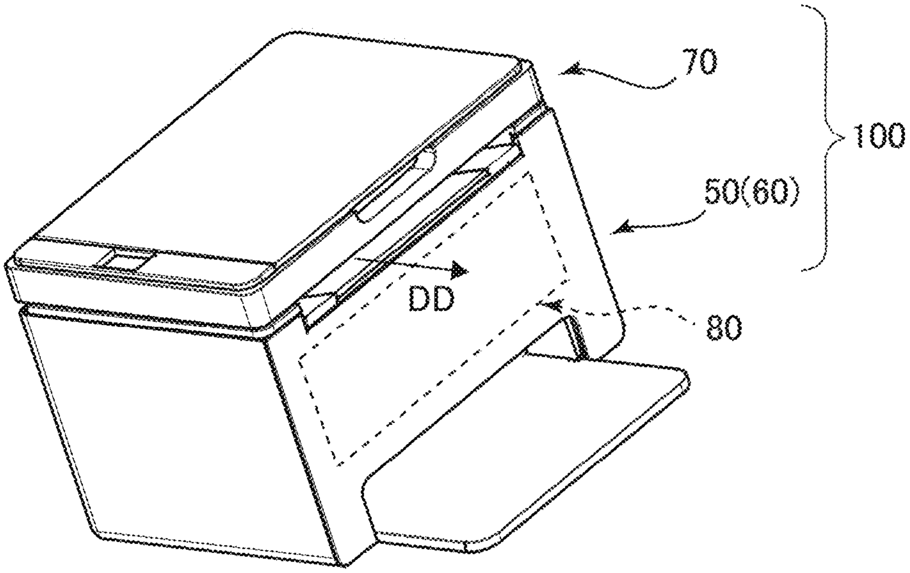
FIG. 1A is an overall schematic view illustrating a printer according to a first exemplary embodiment.

A printer 100 as an image forming apparatus according to the first exemplary embodiment is an electrophotographic laser beam printer. As illustrated in FIG. 1A, the printer 100 includes a printer body 50 as an apparatus body, and an image reading apparatus 70 mounted on an upper portion of the printer body 50. Note that, in the following description, the sheet includes, in addition to plain paper, special paper such as coated paper, a recording material having a special shape such as an envelope or index paper, and a plastic film or cloth for an overhead projector, and a document is an example of the sheet. Note that the document, which is an example of the sheet, may be white paper, or an image may be formed on one side or both sides.

Figure 1B:
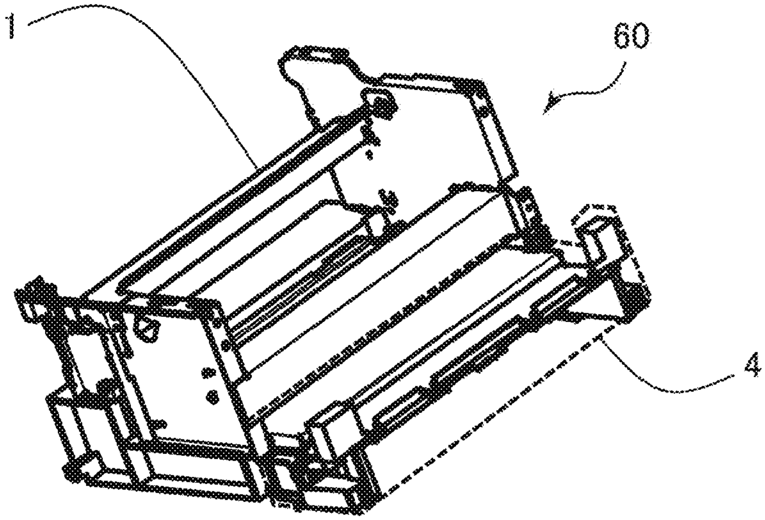
FIG. 1B is a perspective view illustrating a casing.
Figure 13:
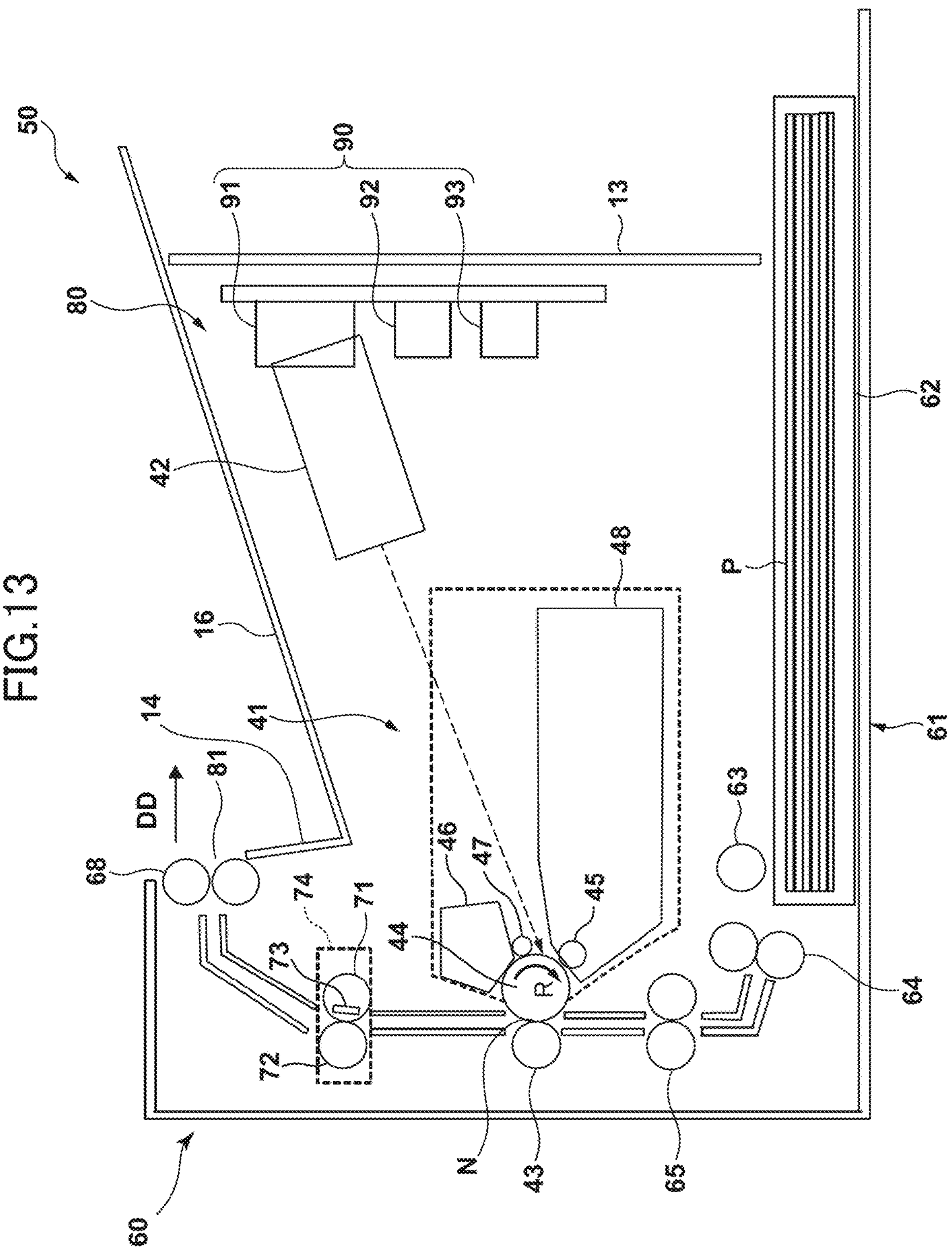
FIG. 13 is a cross-sectional view illustrating the printer.

As illustrated in FIG. 13, the printer body 50 includes an image forming unit 80 that consumes toner as a consumable material and forms a toner image on a recording medium P, and a feeding unit 61 that feeds the recording medium P. In addition, the printer body 50 includes a fixing unit 74 that fixes the toner image formed by the image forming unit 80 to a recording medium, a sheet discharge roller pair 68, and a processing circuit 90. The image forming unit 80 is accommodated in a frame body 1 (see FIG. 1B) of a casing 60 of the printer body 50.

The image forming unit 80 includes a scanner unit 42, an electrophotographic process unit 41, and a transfer roller 43 that transfers the toner image formed on the photosensitive drum 44 of the process unit 41 to the recording medium P. The process unit 41 includes a photosensitive drum 44, a cleaning unit 46 disposed around the photosensitive drum 44, a charge roller 47, a developing roller 45, and a storage portion 48 that stores toner. Note that the process unit 41 may be screwed to the casing 60 of the printer body 50, and may be a unit to be removed by a service engineer.

The photosensitive drum 44 as an image bearing member is a photosensitive member molded in a cylindrical shape, and has an end in the longitudinal direction (second direction D2) supported by the frame body 1. The photosensitive drum 44 of the present exemplary embodiment has a photosensitive layer formed of a negatively charged organic photosensitive member on a drum-shaped substrate formed of aluminum. In addition, the photosensitive drum 44 is rotationally driven at a predetermined process speed in a predetermined direction (direction R in the drawing) by a motor.

The charge roller 47 is in contact with the photosensitive drum 44 with a predetermined pressure contact force to form a charging unit. In addition, a desired charging voltage is applied by the charging high-voltage power supply, whereby the surface of the photosensitive drum 44 is uniformly charged to a predetermined potential. In the present exemplary embodiment, the photosensitive drum 44 is negatively charged by the charge roller 47.

The scanner unit 42 scans and exposes the surface of the photosensitive drum 44 by irradiating the photosensitive drum 44 with laser light corresponding to image information input from an external apparatus using a polygon mirror. By this exposure, an electrostatic latent image corresponding to the image information is formed on the surface of the photosensitive drum 44. Note that the scanner unit 42 is not limited to the laser scanner apparatus, and for example, an LED exposing unit having an LED array in which a plurality of LEDs are arranged along the longitudinal direction of the photosensitive drum 44 may be adopted.

The developing roller 45 is rotatably supported by the storage portion 48. The developing roller 45 is disposed so as to face the photosensitive drum 44. The storage portion 48 may be provided with a supply roller that applies the toner stored in the storage portion 48 to the surface of the developing roller 45.

The process unit 41 of the present exemplary embodiment uses a contact development method as a development method. That is, the toner layer borne on the developing roller 45 comes into contact with the photosensitive drum 44 at a developing portion (developing region) where the photosensitive drum 44 and the developing roller 45 face each other. A developing voltage is applied to the developing roller 45 by a developing high-voltage power supply. Under the developing voltage, the toner borne on the developing roller 45 is transferred from the developing roller 45 to the surface of the photosensitive drum 44 according to the potential distribution on the surface of the photosensitive drum, whereby the electrostatic latent image is developed into the toner image.

In addition, the toner of the present exemplary embodiment does not contain a magnetic component, and is a so-called non-magnetic one-component developer in which the toner is borne on the developing roller 45 mainly by an intermolecular force or an electrostatic force (mirror image force). However, a one-component developer containing a magnetic component may be used. In addition, the one-component developer may contain an additive (for example, wax or silica fine particles) for adjusting fluidity and charging performance of the toner in addition to the toner particles. As the developer, a two-component developer composed of a nonmagnetic toner and a magnetic carrier may be used. When a developer having magnetism is used, for example, a cylindrical developing sleeve in which a magnet is disposed is used as the developer bearing member.

The fixing unit 74 is of a heat fixing type that performs image fixing processing by heating and melting toner on a recording medium. The fixing unit 74 includes a heating roller 71 incorporating a fixing heater 73, and a pressure roller 72 that comes into pressure contact with the heating roller 71. The feeding unit 61 includes a cassette 62 on which the recording medium P is loaded, a pickup roller 63, and a pair of separation rollers 64. The cassette 62 can be pulled out from the casing 60 of the printer body 50.

The processing circuit 90 includes a plurality of electronic components 91, 92, and 93 disposed on a substrate. For example, the electronic component 91 may be a processor, the electronic component 92 may be a memory, and the electronic component 93 may be an input/output device. The input/output device may include a communication interface. When a job for instructing image formation is input to the printer body 50, for example, an image forming process based on input image data received from an external computer is started. The processing circuit 90 operates as a controller for controlling the image forming process.

Next, an image forming process of the printer body 50 will be described. When the image forming process is started, the scanner unit 42 irradiates the photosensitive drum 44 with laser light on the basis of the input image information. At this time, the photosensitive drum 44 is charged in advance by the charge roller 47, and an electrostatic latent image is formed on the photosensitive drum 44 by being irradiated with laser light. Thereafter, the electrostatic latent image is developed by the developing roller 45, and a toner image as an image is formed on the photosensitive drum 44.

In parallel with the above-described image forming process, the pickup roller 63 of the feeding unit 61 feeds the recording medium P supported by the cassette 62. The recording medium P is separated one by one by a pair of separation rollers 64 and conveyed to the pair of separation rollers 64. Then, the recording medium P is conveyed by the pair of separation rollers 64 toward a transfer nip N formed by the transfer roller 43 and the photosensitive drum 44.

A transfer voltage is applied to the transfer roller 43 from a transfer high-voltage power supply, and the toner image borne on the photosensitive drum 44 is transferred to the recording medium P conveyed by the pair of separation rollers 64. The recording medium P to which the toner image has been transferred is conveyed to the fixing unit 74, and the toner image is heated and pressurized when passing through the nip portion between the heating roller 71 and the pressure roller 72 of the fixing unit 74. As a result, the toner particles are melted and then fixed, whereby the toner image is fixed on the recording medium P. The recording medium P that has passed through the fixing unit 74 is discharged from a discharge port 81 to the outside (outside the apparatus) of the printer body 50 by the sheet discharge roller pair 68, and is stacked on a sheet discharge tray 16. After the toner image is transferred to the recording medium P, the toner remaining on the photosensitive drum 44 is cleaned by the cleaning unit 46.

Note that the printer body 50 of the present exemplary embodiment has a configuration capable of forming an image on only one surface of the recording medium P, but is not limited thereto. For example, a duplex conveyance path for reversing the recording medium P on which an image is formed on a first surface may be provided in the printer body 50, and the printer body 50 may be configured to be capable of forming an image on both surfaces of the recording medium P.

The printer body 50 includes the casing 60 (see FIG. 1A) having a plurality of frames forming a structure of the printer body 50 and a plurality of covers forming an exterior of the printer body 50. As illustrated in FIGS. 1B to 3E, the casing 60 includes the frame body 1, a bottom frame 4 fixed to the frame body 1, a pillar 17 fixed to the frame body 1, a top cover 10, a left cover 11, a right cover 12, and a front cover 13. The casing 60 includes an inner rear cover 14, an inner cover 15, a sheet discharge tray 16, and a rear cover (not illustrated). More specifically, the frame of the casing 60 includes the frame body 1, the bottom frame 4, and the pillar 17. The frame body 1 is made of a metal material such as sheet metal, and the bottom frame 4 and the pillar 17 are made of a resin material. The exterior of the casing 60 includes the top cover 10, the left cover 11, the right cover 12, the front cover 13, the inner rear cover 14, the inner cover 15, the sheet discharge tray 16, and the rear cover (not illustrated), which are made of a resin material.

Assembly of Frame and Exterior of Printer

Figure 2A:
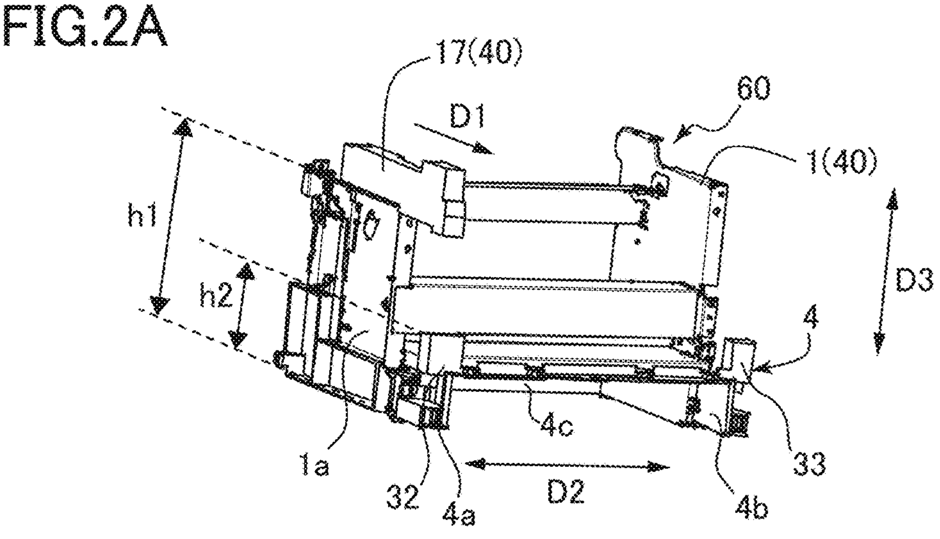
FIG. 2A is a perspective view illustrating a state in which a pillar and a bottom frame are attached to a frame body.

Next, the order of assembling the frame and the exterior of the printer 100 will be described with reference to FIGS. 2A to 3E. First, as illustrated in FIG. 2A, in the following description, it is assumed that the printer 100 is installed on a horizontal plane, and with respect to the frame body 1, the front cover 13 side is defined as a front side, the rear cover side is defined as a rear side, the left cover 11 side is defined as a left side, the right cover 12 side is defined as a right side, and the top cover 10 side is defined as an upper side. In the following description, a direction from the rear toward the front is referred to as a first direction D1, and a direction from the left toward the right and a direction from the right toward the left, that is, a width direction of the printer 100 is referred to as a second direction D2. The first direction D1 and the second direction D2 are parallel to the horizontal direction. The first direction D1 is a direction along a sheet discharge direction DD (see FIG. 1A) by the sheet discharge roller pair 68. Further, a direction from the upper side to the lower side and a direction from the lower side to the upper side, that is, the vertical direction of the printer 100 is defined as a vertical direction D3. The second direction D2 as the longitudinal direction of the photosensitive drum 44 is a direction orthogonal to the first direction D1 and the vertical direction D3. The vertical direction D3 perpendicularly intersects a horizontal plane formed by the first direction D1 and the second direction D2.

An operator attaches the bottom frame 4 and the pillar 17 to the frame body 1. The frame body 1 and the pillar 17 form a first frame 40, and the bottom frame 4 as a second frame is configured separately from the first frame 40. The frame body 1 includes a side plate 1*a*. The pillar 17 as an extension member is fixed to an upper portion of the side plate 1*a* and extends in the first direction D1. The bottom frame 4 is fixed to a lower portion of the side plate 1*a* via a mold frame and extends in the first direction D1. The bottom frame 4 may support the frame body 1 from below in the vertical direction D3. The length h2 of the bottom frame 4 in the vertical direction D3 is shorter than the length h1 of the side plate 1*a* in the vertical direction D3. The pillar 17 and the bottom frame 4 extend downstream of the side plate 1*a* in the first direction D1 and the discharge direction DD.

Figure 9:
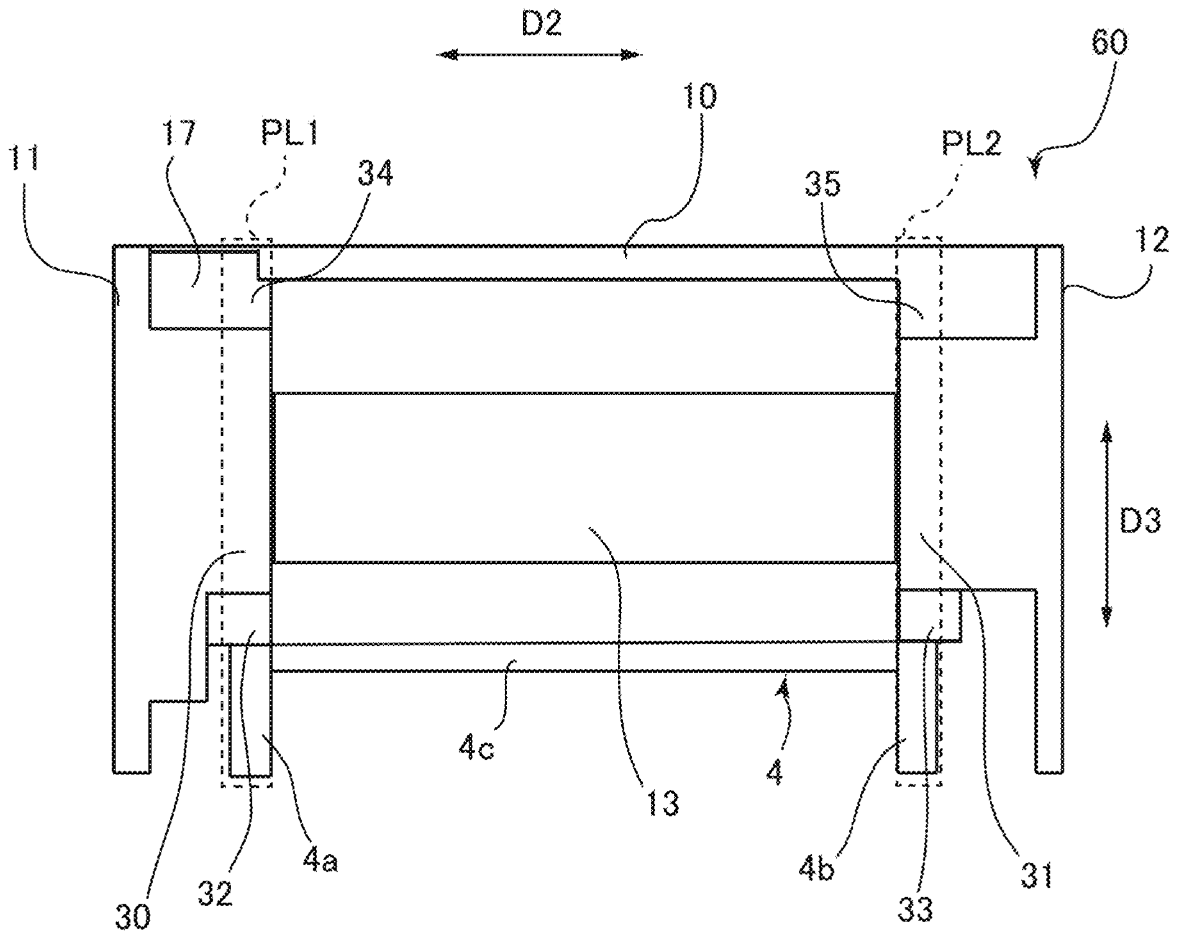
FIG. 9 is a schematic front view illustrating a casing.

As illustrated in FIGS. 2A and 9, the bottom frame 4 is formed in a substantially U-shape when viewed from the downstream side to the upstream side in the first direction D1. The bottom frame 4 includes a left wall portion 4*a* disposed on the left side of the casing 60 and extending in the vertical direction D3, a right wall portion 4*b* disposed on the right side of the casing 60 and extending in the vertical direction D3, and a connecting portion 4*c* extending in the second direction D2 so as to connect the left wall portion 4*a* and the right wall portion 4*b*. Further, the left wall portion 4*a* is provided with a second pillar portion 32, which will be described later, extending upward from the left wall portion 4*a*. The right wall portion 4*b* is provided with a fifth pillar portion 33 (to be described later) extending upward from the right wall portion 4*b*.

Figure 2B:
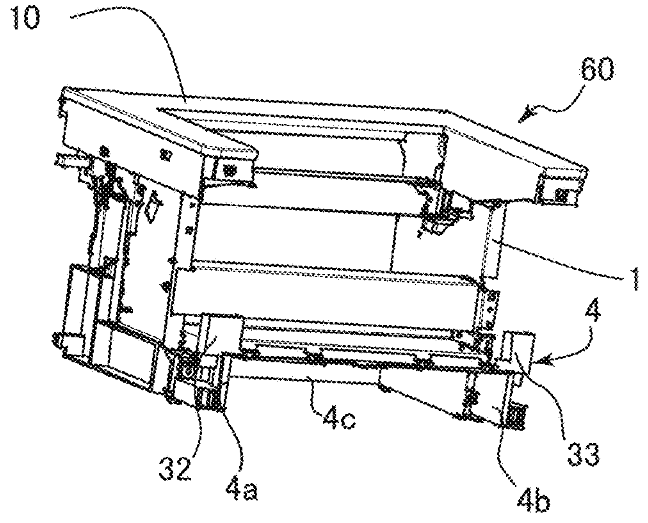
FIG. 2B is a perspective view illustrating a state in which a top cover is attached to the frame body.
Figure 2C:
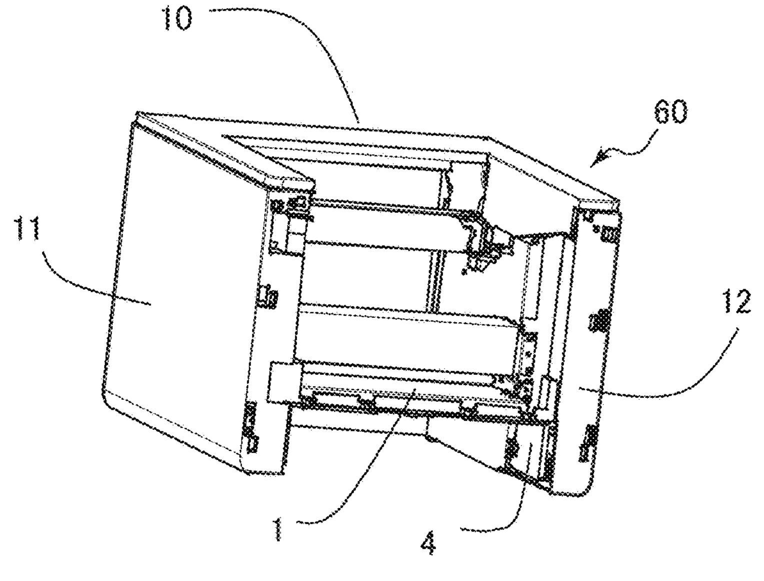
FIG. 2C is a perspective view illustrating a state in which a left cover and a right cover are attached to the frame body.
Figure 3A:
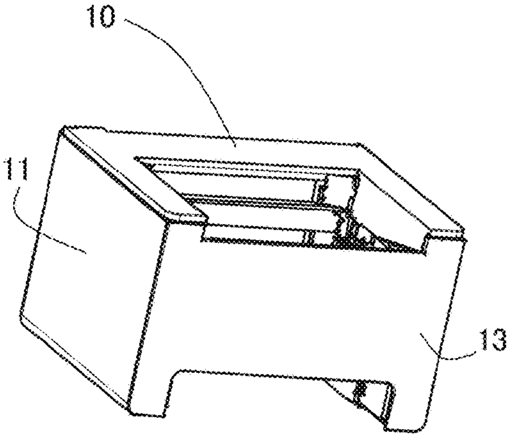
FIG. 3A is a perspective view illustrating a state in which a front cover is attached to a frame body.

Next, as illustrated in FIG. 2B, the operator attaches the top cover 10 to the frame body 1 and the pillar 17. Then, as illustrated in FIG. 2C, the operator attaches the left cover 11 and the right cover 12 to the frame body 1, and further attaches the front cover 13 to the front side of the printer 100 as illustrated in FIG. 3A.

Figure 3B:
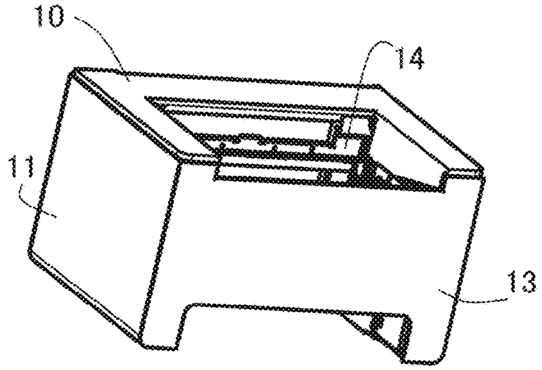
FIG. 3B is a perspective view illustrating a state in which an inner rear cover is attached to the frame body.
Figure 3C:
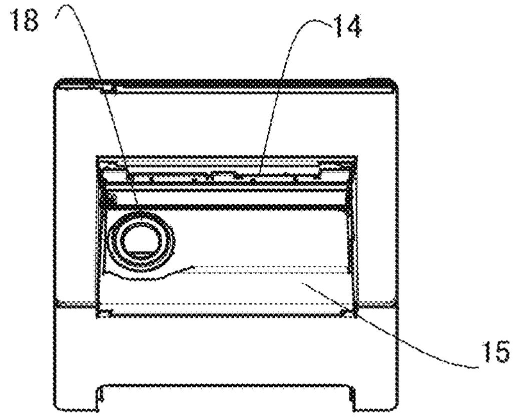
FIG. 3C is a perspective view illustrating a state in which the inner rear cover and an inner cover are attached to the frame body.
Figure 3D:
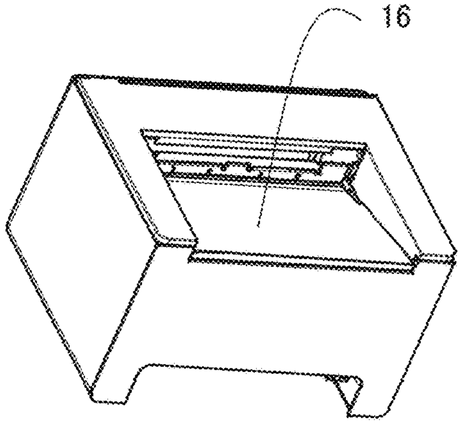
FIG. 3D is a perspective view illustrating a state in which a sheet discharge tray is attached to the inner cover.
Figure 3E:
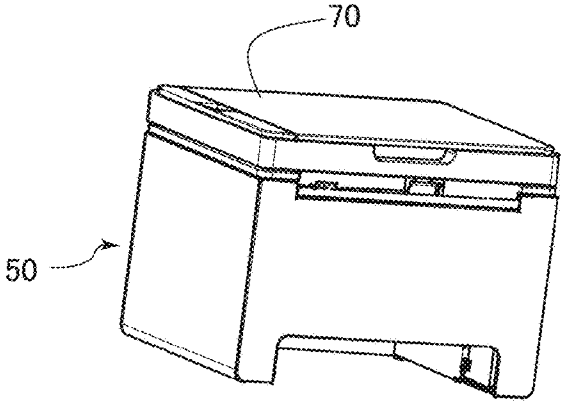
FIG. 3E is a perspective view illustrating a state in which an image reading apparatus is attached to a printer body.

Next, as illustrated in FIG. 3B, the operator attaches the inner rear cover 14 to the frame body 1. The inner rear cover 14 is a member in which the discharge port 81 (see FIG. 13) is formed, and is provided in the vicinity of the sheet discharge roller pair 68. Further, the operator attaches the inner cover 15 to the frame body 1 as illustrated in FIG. 3C, and rotatably attaches the sheet discharge tray 16 to the inner cover 15 as illustrated in FIG. 3D. The inner cover 15 is a member provided with a supply port 18, and covers the image forming unit 80 from above. Here, the sheet discharge tray 16 is configured to be rotatable so that the user can access the toner supply port 18 provided in the inner cover 15 at the time of toner supply. That is, the inner cover 15 provided with the supply port 18 is disposed below the sheet discharge tray 16 in the closed state. The user can easily supply the toner to the developer container of the printer 100 by attaching the supply pack containing toner to the supply port 18 and performing the toner supply operation. Finally, as illustrated in FIG. 3E, the operator attaches the image reading apparatus 70 to the upper portion of the printer body 50, and the assembly work of the frame and the exterior of the printer 100 is completed.

Further, the image reading apparatus 70 is configured to be rotatable with respect to the printer body 50, and a user can access the sheet discharged to the sheet discharge tray 16 by rotating the image reading apparatus 70. Further, by rotating the sheet discharge tray 16 in this state, the user can access the toner supply port 18. The image reading apparatus 70 and the sheet discharge tray 16 are configured to be rotatable to such an extent that the supply pack can be attached to the supply port 18.

Figure 4A:
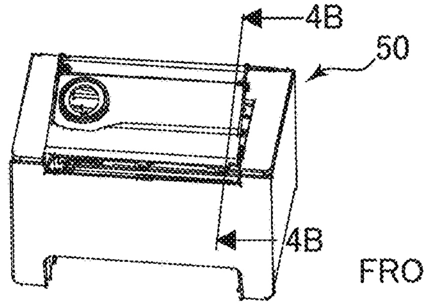
FIG. 4A is a perspective view illustrating the printer body immediately before attaching the inner cover.
Figure 4B:
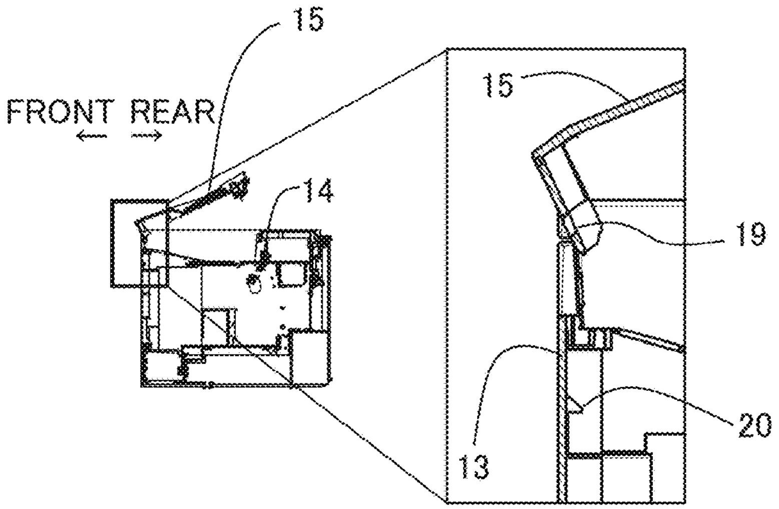
FIG. 4B is a cross-sectional view along line 4B-4B of FIG. 4A and a partially enlarged view thereof.
Figure 4C:
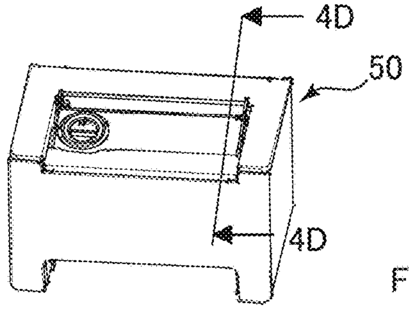
FIG. 4C is a perspective view illustrating the printer body when the inner cover starts to be attached.
Figure 4D:
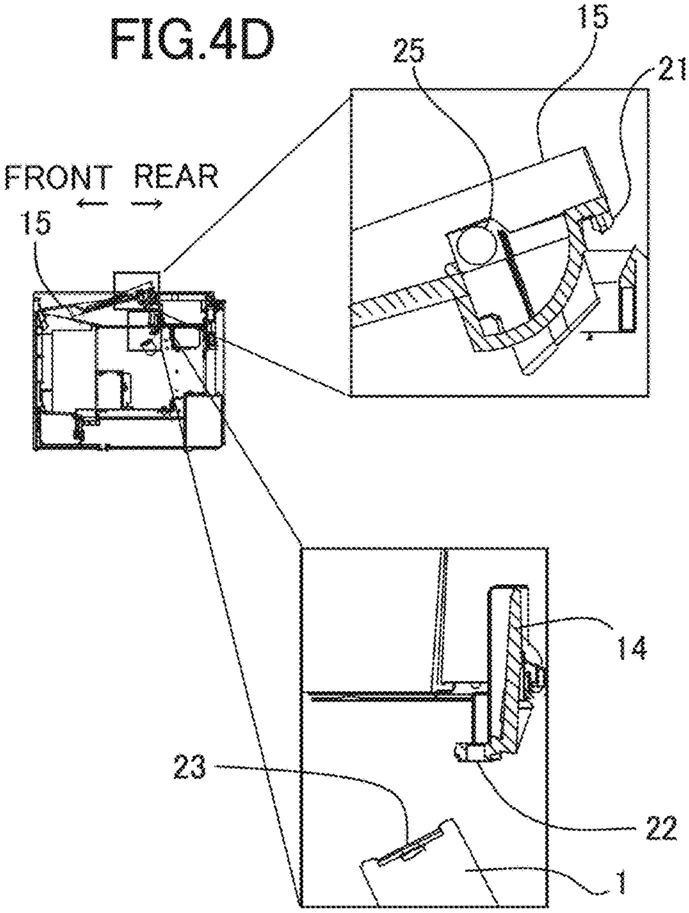
FIG. 4D is a cross-sectional view along line 4D-4D of FIG. 4C and a partially enlarged view thereof, illustrating the printer body when the inner cover starts to be attached.
Figure 5A:
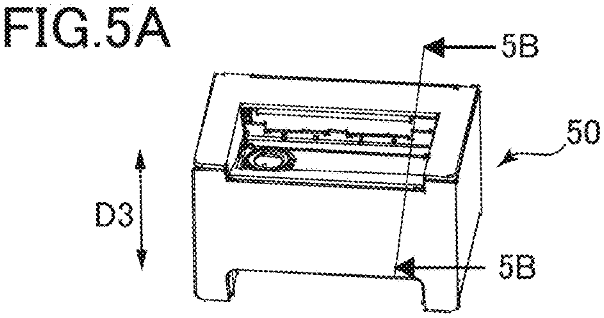
FIG. 5A is a perspective view illustrating the printer body in a state where the inner cover is positioned.
Figure 5B:
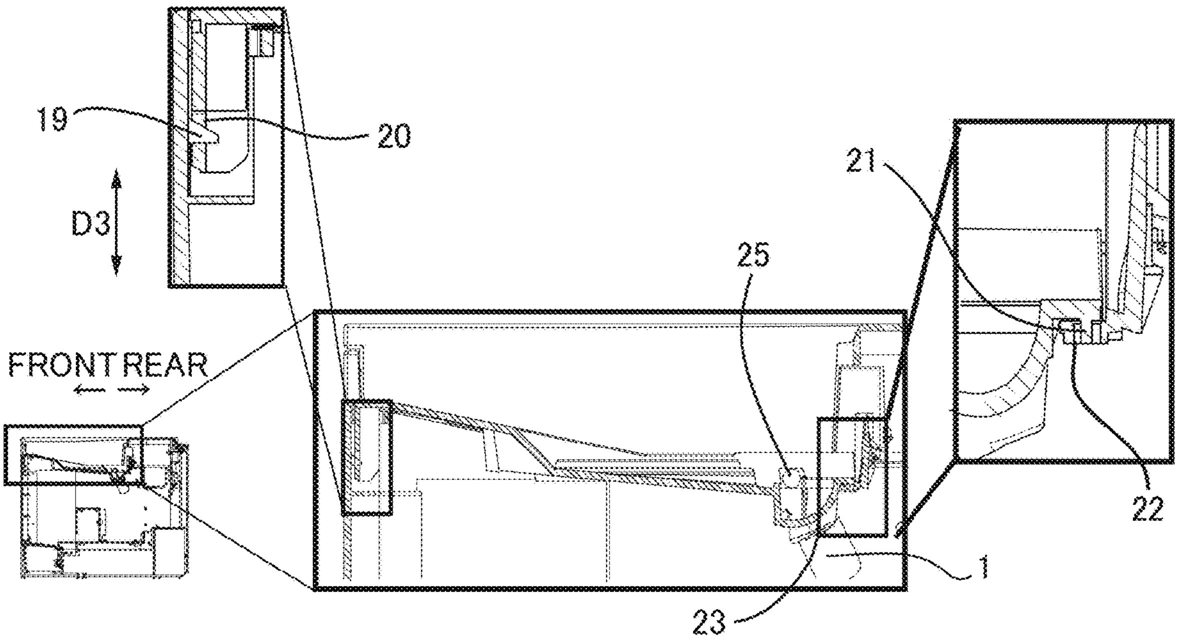
FIG. 5B is a cross-sectional view along line 5B-5B of FIG. 5A and a partially enlarged view thereof, illustrating the printer body in a state where the inner cover is positioned.
Figure 5C:
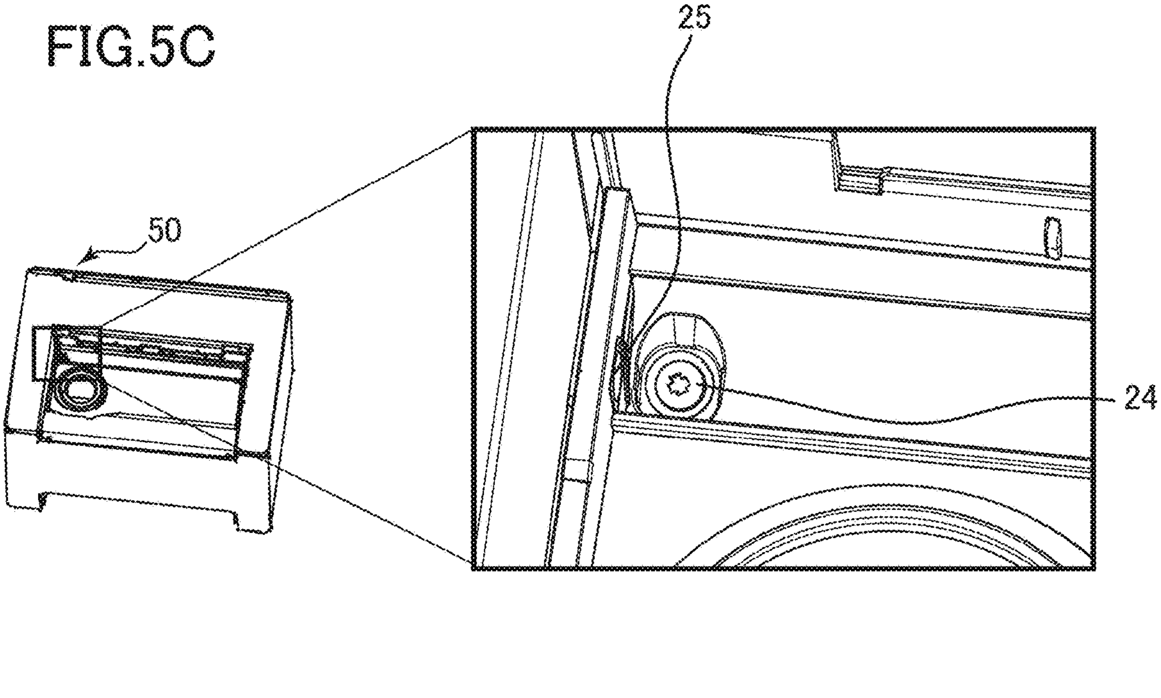
FIG. 5C is an enlarged view of the printer body and a part thereof in a state where the inner cover is fixed with a screw.

Next, a method of attaching the inner cover 15 and the sheet discharge tray 16 will be described in more detail with reference to FIGS. 4A to 6B. FIG. 4A is a perspective view illustrating the printer body 50 immediately before the inner cover 15 is attached, and FIG. 4B is a cross-sectional view along line 4B-4B of FIG. 4A and a partially enlarged view thereof illustrating the printer body 50 immediately before the inner cover 15 is attached. FIG. 4C is a perspective view illustrating the printer body 50 when the inner cover 15 starts to be attached, and FIG. 4D is a cross-sectional view along line 4D-4D of FIG. 4C and a partially enlarged view thereof, illustrating the printer body 50 when the inner cover 15 starts to be attached. FIG. 5A is a perspective view illustrating the printer body 50 in a state where the inner cover 15 is positioned, and FIG. 5B is a cross-sectional view along line 5B-5B of FIG. 5A and a partially enlarged view thereof, illustrating the printer body 50 in a state where the inner cover 15 is positioned. FIG. 5C is a partially enlarged view of the printer body 50 in a state where the inner cover 15 is fixed with a screw 24. In FIGS. 4A to 6B, the inner rear cover 14 is attached in advance.

As illustrated in FIGS. 4A and 4B, the inner cover 15 is provided with a positioning hole 19, and the front cover 13 is provided with a claw portion 20 that can be engaged with the positioning hole 19. The operator inserts the inner cover 15 into the printer body 50 so that the positioning hole 19 is engaged with the claw portion 20.

As illustrated in FIGS. 4C and 4D, the inner cover 15 is provided with a positioning boss 21 and a hole 25, and the inner rear cover 14 is provided with a positioning hole 22 that can be engaged with the positioning boss 21. As illustrated in FIGS. 4C to 5B, the operator inserts the claw portion 20 into the positioning hole 19 of the inner cover 15 on the front side of the printer body 50. Since the claw portion 20 extends rearward from the back surface side of the front cover 13, the position of the inner cover 15 in the vertical direction D3 is determined by engagement between the claw portion 20 and the positioning hole 19.

Then, in this state, by swinging the rear portion of the inner cover 15 downward, the positioning boss 21 is inserted into the positioning hole 22. Since the positioning boss 21 extends downward, the position of the inner cover 15 in the front-rear direction is determined by engagement between the positioning boss 21 and the positioning hole 22.

A screw hole 23 provided in the frame body 1 is provided below the inner cover 15 engaged with the front cover 13 and the inner rear cover 14. As illustrated in FIG. 5C, the inner cover 15 is fixed to the frame body 1 by being fastened to the screw hole 23 with the screw 24. Note that the sheet discharge tray 16 may be fixed to a member other than the frame body 1.

Figure 6A:
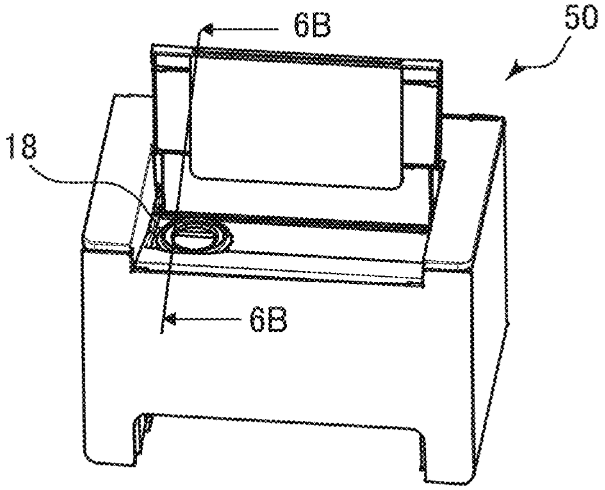
FIG. 6A is a perspective view illustrating a printer body in a state in which each frame and an exterior are assembled.
Figure 6B:
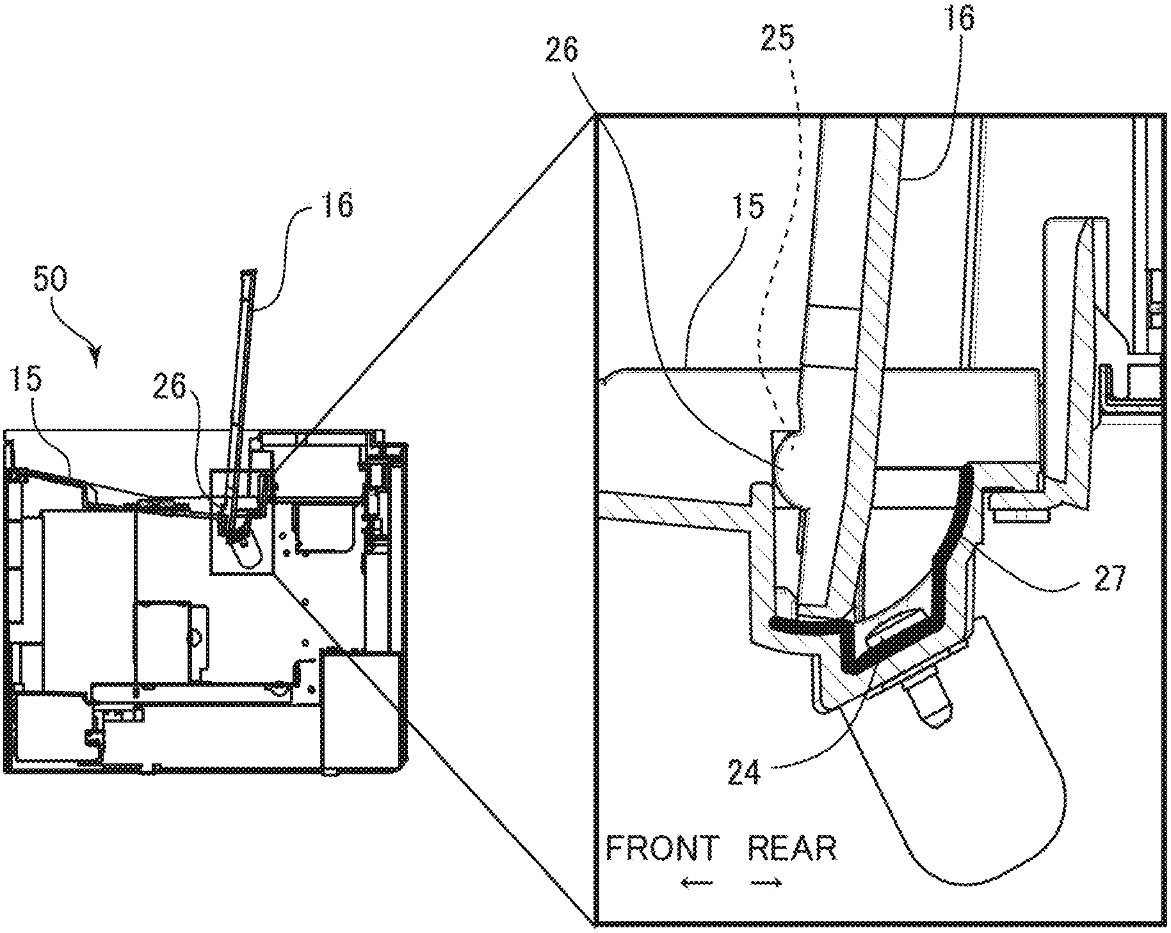
FIG. 6B is a cross-sectional view illustrating a cross-sectional view along line 6B-6B of FIG. 6A and a partially enlarged view thereof.

FIG. 6A is a perspective view illustrating the printer body 50 in a state where each frame and the exterior are assembled. FIG. 6B is a cross-sectional view along line 6B-6B of FIG. 6A and a partially enlarged view thereof. As illustrated in FIGS. 6A and 6B, the sheet discharge tray 16 is configured to be rotatable about the shaft portion 26 by inserting the shaft portion 26 provided in the sheet discharge tray 16 into the hole 25 of the inner cover 15. In addition, the inner cover 15 is formed with a curved portion 27 recessed downward so as to avoid a rotation locus of the sheet discharge tray 16.

The screw 24 fastens the inner cover 15 to the frame body 1 in the vicinity of the curved portion 27. The screw 24 is positioned behind the sheet discharge tray 16 in the opened state. Therefore, in a state where the sheet discharge tray 16 is opened, the screw 24 is hidden behind the sheet discharge tray 16 and cannot be visually recognized from the front side of the printer 100. In a state where the sheet discharge tray 16 is closed, the screw 24 is positioned below the sheet discharge tray 16, and the sheet discharge tray 16 is not exposed to the outside. By arranging the screw 24 in this manner, it is difficult for the user to see the screw 24 regardless of the posture of the sheet discharge tray 16, and the appearance of the printer 100 can be improved.

Pillar Structure of Casing of First Exemplary Embodiment

Figure 7A:
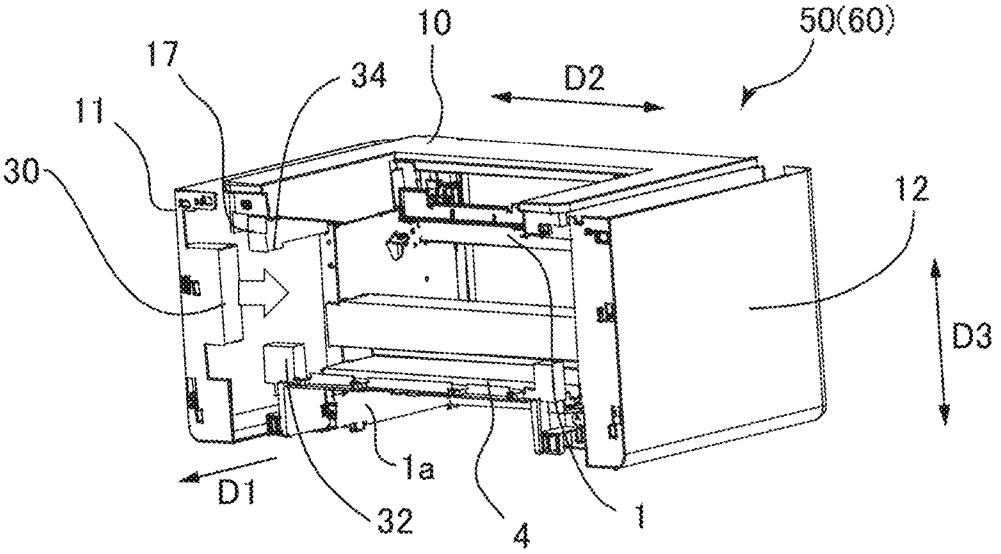
FIG. 7A is a perspective view illustrating a printer body immediately before attaching a left cover and a right cover.
Figure 7B:
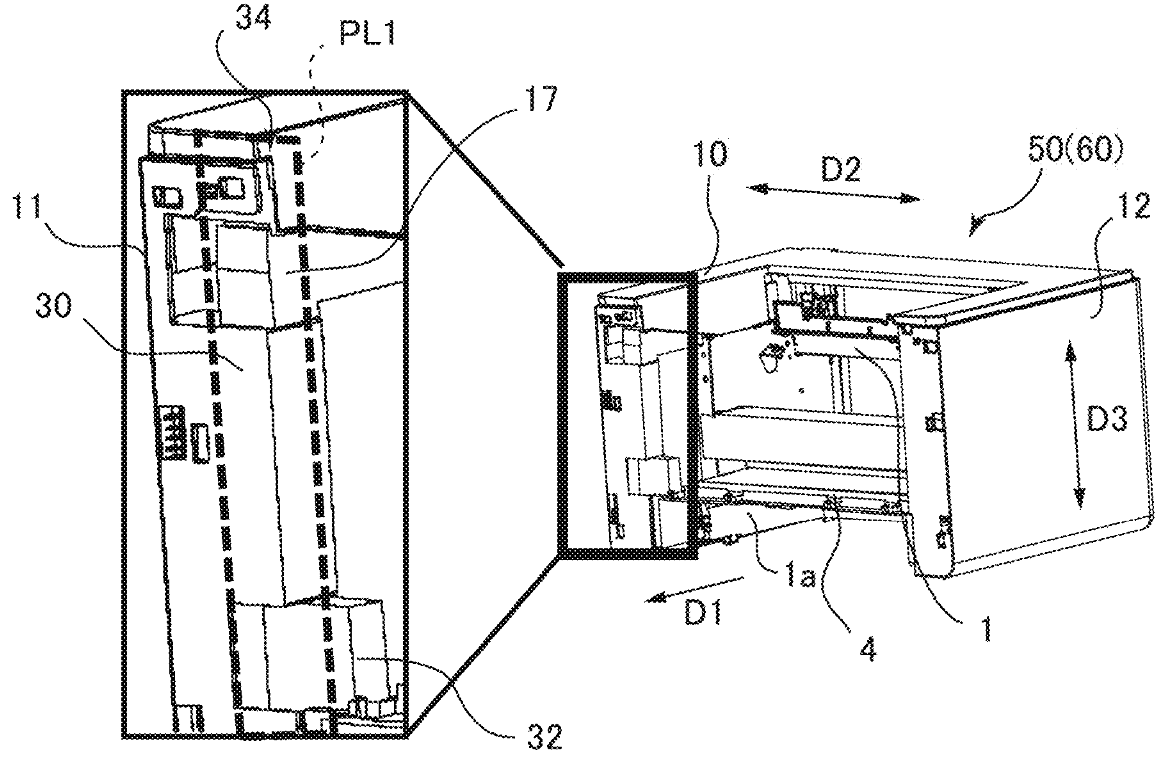
FIG. 7B is a perspective view and a partially enlarged view illustrating the printer body in a state where the left cover and the right cover are attached.
Figure 8A:
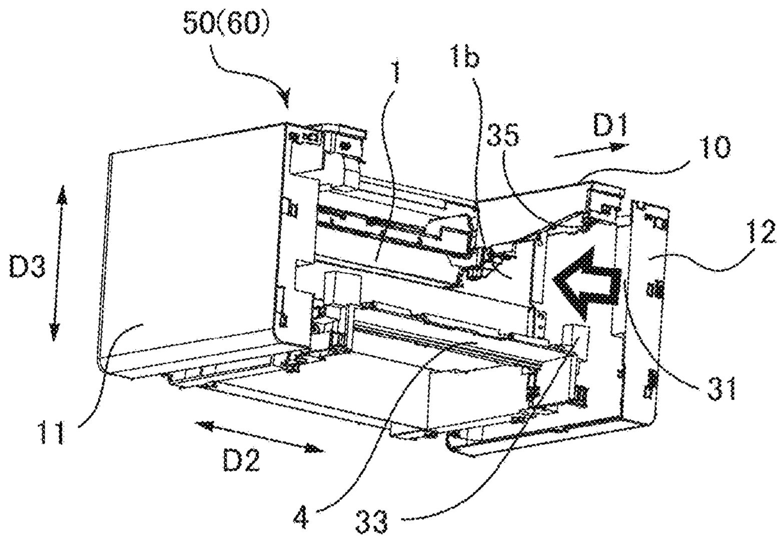
FIG. 8A is another perspective view illustrating the printer body 50 immediately before attaching the left cover and the right cover.
Figure 8B:
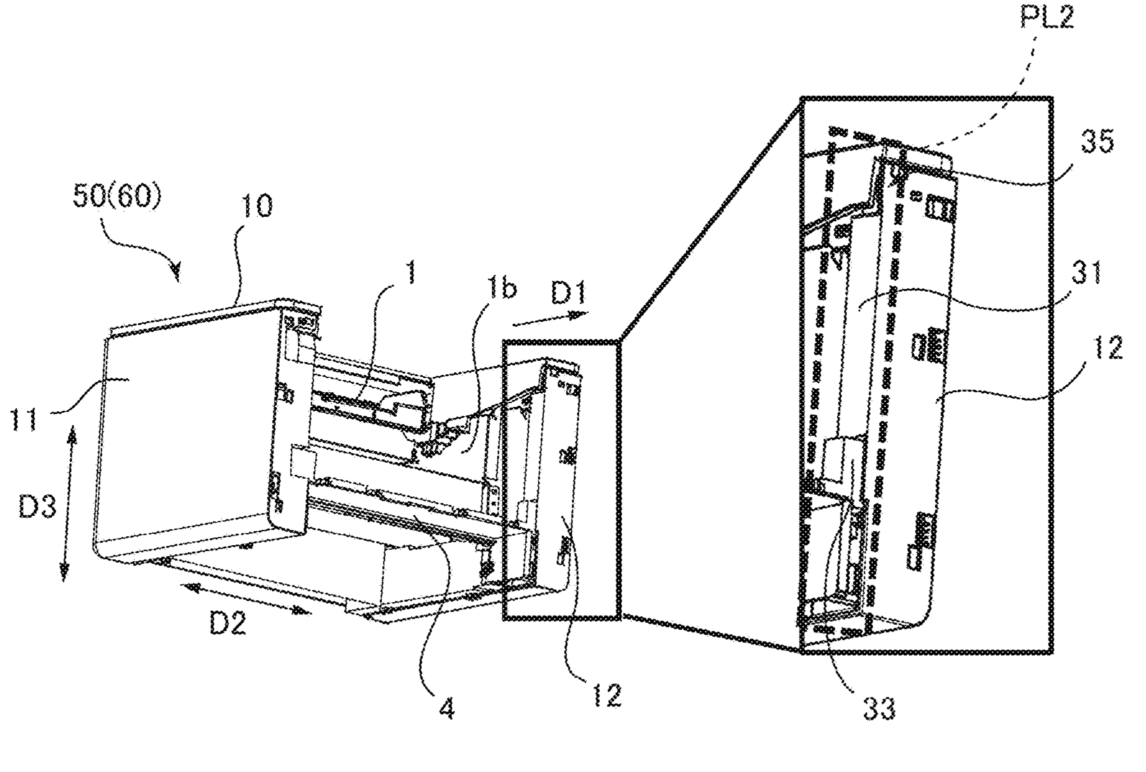
FIG. 8B is another perspective view and a partially enlarged view illustrating the printer body in a state where the left cover and the right cover are attached.

Next, a pillar structure of the casing 60 of the printer body 50 will be described with reference to FIGS. 7A to 10B. FIG. 7A is a perspective view illustrating the printer body 50 immediately before the left cover 11 and the right cover 12 are attached, and FIG. 7B is a perspective view and a partially enlarged view illustrating the printer body 50 in a state where the left cover 11 and the right cover 12 are attached. FIG. 8A is another perspective view illustrating the printer body 50 immediately before the left cover 11 and the right cover 12 are attached, and FIG. 8B is another perspective view and a partially enlarged view illustrating the printer body 50 in a state where the left cover 11 and the right cover 12 are attached. FIG. 9 is a schematic front view illustrating the casing 60.

As illustrated in FIGS. 7A, 7B, and 9, the left cover 11 as a side cover and a first side cover extends along the first direction D1 and the vertical direction D3, and forms one side surface of the casing 60. In other words, the left cover 11 extends in the discharge direction DD (see FIG. 1A) and the vertical direction D3 and covers the side plate 1*a*. The top cover 10 forms a top surface of the casing 60. As described above, in the left front portion of the casing 60, the pillar 17 and the bottom frame 4 extend downstream of the side plate 1*a* in the first direction D1, and there is a space in a region surrounded by the pillar 17, the side plate 1*a*, and the bottom frame 4. In the present exemplary embodiment, a third pillar portion 30 is provided on the left cover 11 so as to enter the space. Hereinafter, the pillar structure of the left front portion of the casing 60 will be described in detail.

A part of each of the top cover 10 and the pillar 17 forms a first pillar portion 34. The pillar 17 is provided so as to be able to come into contact with the third pillar portion 30 described later. The bottom frame 4 includes a second pillar portion 32 disposed below the first pillar portion 34 and provided at a position at least partially overlapping the first pillar portion 34 as viewed in the vertical direction D3. The second pillar portion 32 is disposed right below the pillar 17. The left cover 11 has the third pillar portion 30 protruding inward of the printer body 50 in the second direction D2, and the third pillar portion 30 is disposed between the first pillar portion 34 and the second pillar portion 32 in the vertical direction D3. The third pillar portion 30 is provided so as to be able to come into contact with the first pillar portion 34 and the second pillar portion 32, and is provided at a position at least partially overlapping the first pillar portion 34 and the second pillar portion 32 as viewed in the vertical direction D3.

As illustrated in FIG. 9, the left wall portion 4*a* of the bottom frame 4 extends in the vertical direction D3, and the second pillar portion 32 provided integrally with the left wall portion 4*a* is provided so as to be able to come into contact with the third pillar portion 30. The right wall portion 4*b* of the bottom frame 4 extends in the vertical direction D3, and the fifth pillar portion 33 provided integrally with the right wall portion 4*b* is provided so as to be able to come into contact with a sixth pillar portion 31 described later. By configuring the bottom frame 4 in this manner, when a load acts on the second pillar portion 32 from above in the vertical direction D3, the left wall portion 4*a* can receive the load. When a load acts on the fifth pillar portion 33 from above in the vertical direction D3, the right wall portion 4*b* can receive the load. Furthermore, since the left wall portion 4*a* and the right wall portion 4*b* of the bottom frame 4 are connected by the connecting portion 4*c*, the bottom frame 4 has high stiffness against a force from the second direction D2.

In the vertical direction D3, there may be a slight gap for assembly between the first pillar portion 34 and the third pillar portion 30 or between the second pillar portion 32 and the third pillar portion 30, or there may be no gap. In any case, the first pillar portion 34 and the third pillar portion 30 or the second pillar portion 32 and the third pillar portion 30 may be provided so as to be able to come into contact with each other when an external force acts on the printer body 50. The first pillar portion 34, the second pillar portion 32, and the third pillar portion 30 are disposed so as to overlap the side plate 1*a* in the second direction D2. Therefore, the casing 60 can be made compact in the second direction D2.

By attaching the left cover 11 to the frame body 1 in this manner, the first pillar portion 34, the second pillar portion 32, and the third pillar portion 30 form a pillar structure PL1 continuous in the vertical direction D3. The pillar structure PL1 is disposed on one end side, that is a first end side, in the second direction D2 and forms a part of the structure of the printer body 50, and can receive an external force particularly in the vertical direction D3 when the external force acts on the printer body 50. For example, the load acting on the first pillar portion 34 from above can be received by the second pillar portion 32 via the third pillar portion 30.

As illustrated in FIGS. 8A and 8B, the right cover 12 as a second side cover extends in the first direction D1 and the vertical direction D3, and forms a side surface opposite to one side surface (the left cover 11 side) of the casing 60. In other words, the right cover 12 extends along the discharge direction DD (see FIG. 1A) and the vertical direction D3. In the right front portion of the casing 60, the top cover 10 and the bottom frame 4 extend downstream of the side plate 1*a* in the first direction D1, and there is a space in a region surrounded by the top cover 10, the right side plate 1*b*, and the bottom frame 4. In the present exemplary embodiment, a sixth pillar portion 31 is provided on the right cover 12 so as to enter the space. Hereinafter, the pillar structure of the right front portion of the casing 60 will be described in detail.

A part of the top cover 10 forms a fourth pillar portion 35. The bottom frame 4 includes the fifth pillar portion 33 disposed below the fourth pillar portion 35 and provided at a position at least partially overlapping the fourth pillar portion 35 as viewed in the vertical direction D3. The right cover 12 has the sixth pillar portion 31 protruding inward of the printer body 50 in the second direction D2, and the sixth pillar portion 31 is disposed between the fourth pillar portion 35 and the fifth pillar portion 33 in the vertical direction D3. Further, the sixth pillar portion 31 is provided so as to be able to come into contact with the fourth pillar portion 35 and the fifth pillar portion 33, and is provided at a position at least partially overlapping the fourth pillar portion 35 and the fifth pillar portion 33 as viewed in the vertical direction D3.

Note that, in the vertical direction D3, there may be a slight gap for assembly between the fourth pillar portion 35 and the sixth pillar portion 31 or between the fifth pillar portion 33 and the sixth pillar portion 31, or there may be no gap. In any case, the fourth pillar portion 35 and the sixth pillar portion 31 or the fifth pillar portion 33 and the sixth pillar portion 31 may be provided so as to be able to come into contact with each other when an external force acts on the printer body 50.

By attaching the right cover 12 to the frame body 1 in this manner, the fourth pillar portion 35, the fifth pillar portion 33, and the sixth pillar portion 31 form a pillar structure PL2 continuous in the vertical direction D3. The pillar structure PL2 is disposed on the other end side, that is a second end side, in the second direction D2 and forms a part of the structure of the printer body 50, and can receive an external force particularly in the vertical direction D3 when the external force acts on the printer body 50. For example, the load acting on the fourth pillar portion 35 from above can be received by the fifth pillar portion 33 via the sixth pillar portion 31.

Figure 10A:
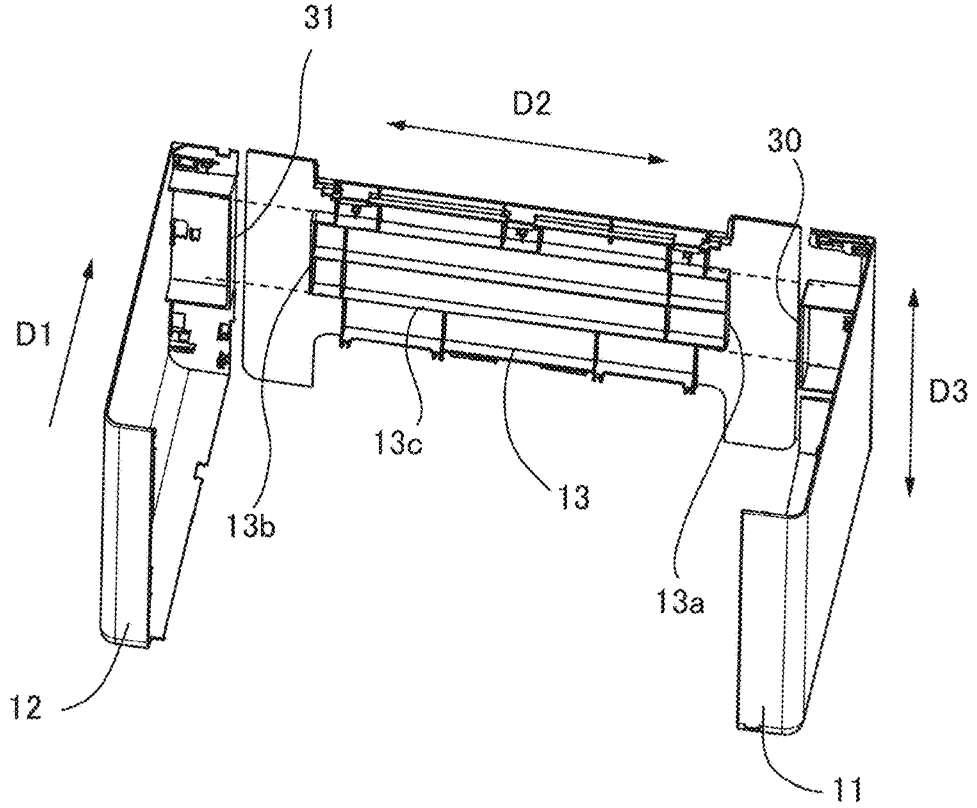
FIG. 10A is a perspective view illustrating a left cover and a front cover immediately before being attached to the front cover.
Figure 10B:
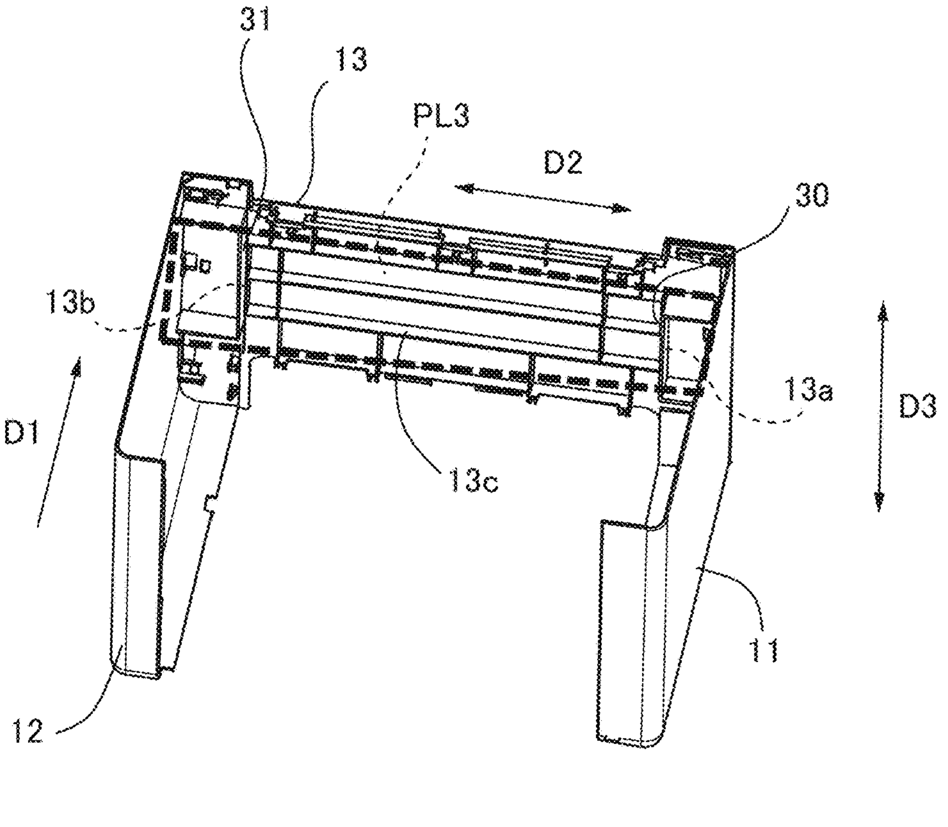
FIG. 10B is a perspective view illustrating the front cover in a state of being attached to the left cover and the right cover.

FIG. 10A is a perspective view illustrating the front cover 13 immediately before being attached to the left cover 11 and the right cover 12, and FIG. 10B is a perspective view illustrating the front cover 13 in a state of being attached to the left cover 11 and the right cover 12. As illustrated in FIGS. 10A and 10B, the front cover 13 as the third side cover extends along the second direction D2 and the vertical direction D3, and forms an exterior on the front side of the printer body 50. The front cover 13 is attached to the left cover 11 and the right cover 12 by a plurality of claw portions (not illustrated), and connects the left cover 11 and the right cover 12.

The front cover 13 includes a first engagement portion 13*a* that can be engaged with the third pillar portion 30 of the left cover 11 and a second engagement portion 13*b* that can be engaged with the sixth pillar portion 31 of the right cover 12. More specifically, the first engagement portion 13*a* is provided so as to be able to come into contact with the right side surface of the third pillar portion 30, and the second engagement portion 13*b* is provided so as to be able to come into contact with the left side surface of the sixth pillar portion 31. Between the first engagement portion 13*a* and the third pillar portion 30 and between the second engagement portion 13*b* and the sixth pillar portion 31, there may be a slight gap, or there may be no gap. In any case, the first engagement portion 13*a* and the third pillar portion 30 or the second engagement portion 13*b* and the sixth pillar portion 31 may be provided so as to be able to come into contact with each other when an external force acts on the printer body 50 in the second direction D2. The first engagement portion 13*a* and the second engagement portion 13*b* are disposed at substantially the same height in the vertical direction D3. The front cover 13 engaged with the left cover 11 and the right cover 12 forms a pillar structure PL3 extending in the second direction D2. The pillar structure PL3 forms a part of the structure of the printer body 50, and can receive an external force particularly in the second direction D2 when the external force acts on the printer body 50. A plurality of ribs 13*c* extending in the second direction D2 are formed on the back side of the front cover 13, and stiffness against a load from the second direction D2 is improved.

Comparative Example

Figure 11A:
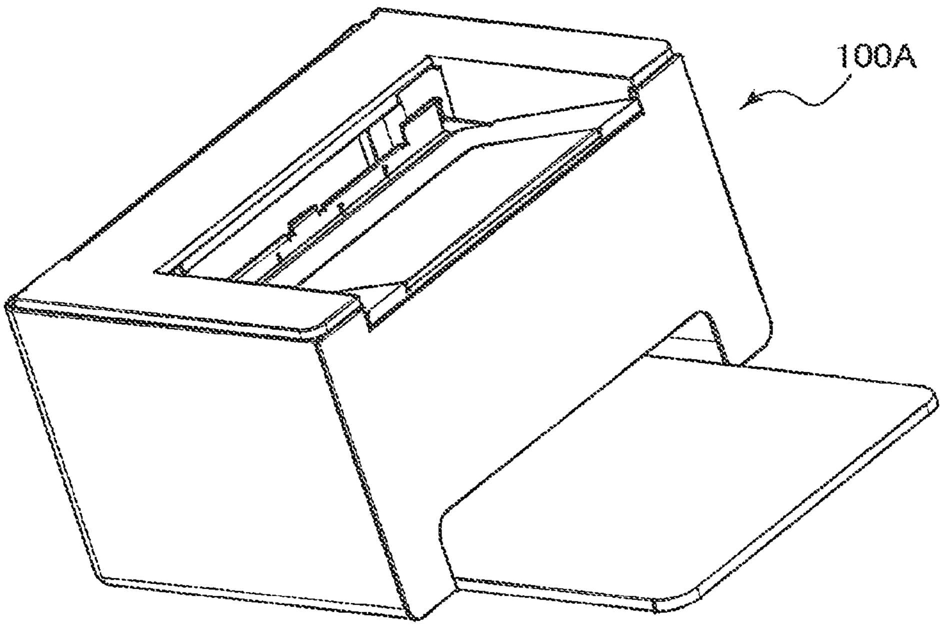
(PRIOR ART) FIG.11A
FIG. 11A is a perspective view illustrating a single-function printer according to a comparative example.
Figure 11B:
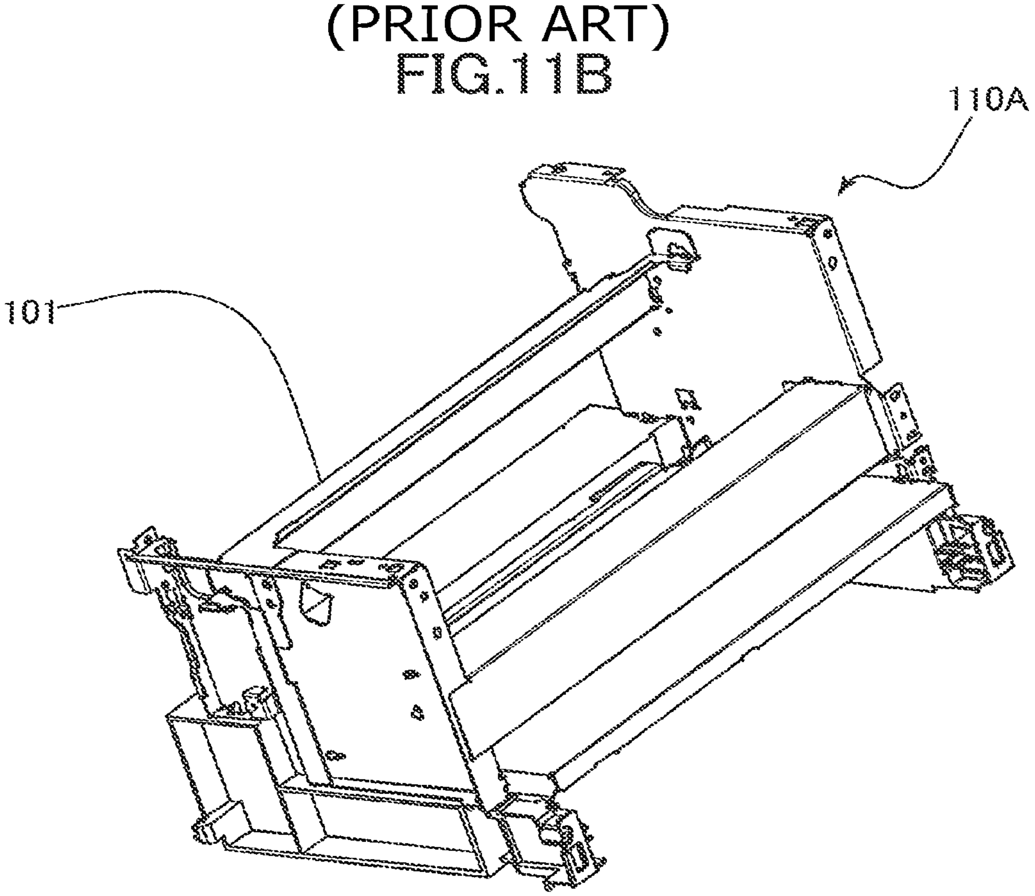
(PRIOR ART) FIG.11B
FIG. 11B is a perspective view illustrating a frame of the single-function printer.
Figure 12A:
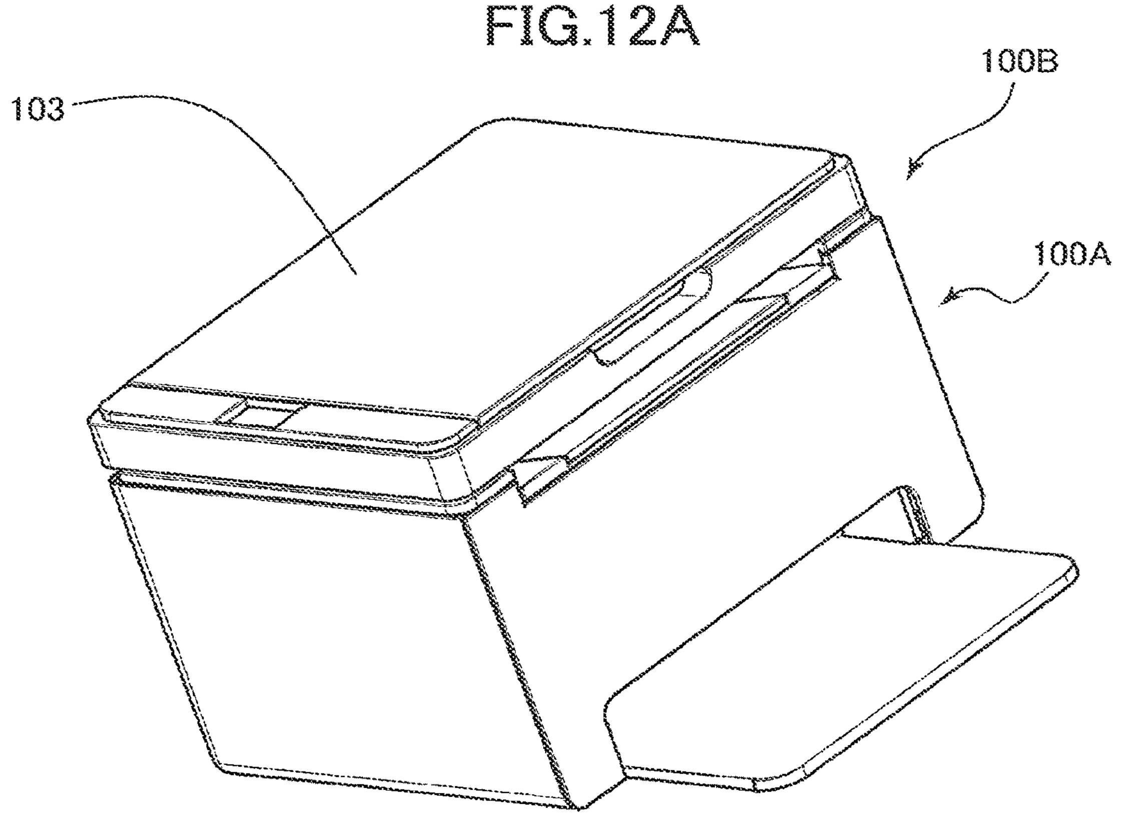
(PRIOR ART) FIG.12A
FIG. 12A is a perspective view illustrating a multi-function printer according to a comparative example.
Figure 12B:
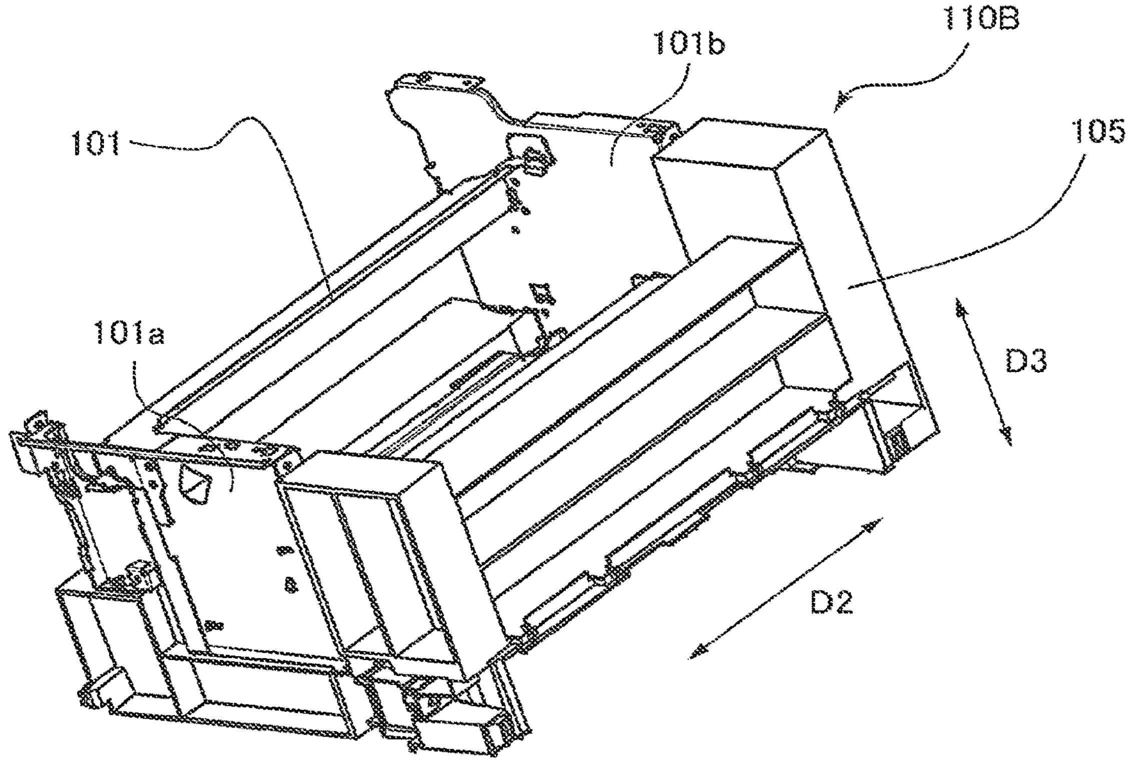
(PRIOR ART) FIG.12B
FIG. 12B is a perspective view illustrating a frame of the multi-function printer.

Next, printers 100A and 100B according to a comparative example will be described with reference to FIGS. 11A to 12B. FIG. 11A is a perspective view illustrating a printer (hereinafter referred to as a single-function printer) 100A specialized in an image forming function without the image reading apparatus. FIG. 11B is a perspective view illustrating a frame 110A of the single-function printer 100A. FIG. 12A is a perspective view illustrating a printer (hereinafter referred to as a multi-function printer) 100B having an image reading function in addition to the image forming function. FIG. 12B is a perspective view illustrating a frame 110B of the multi-function printer 100B.

In recent years, in order to maximize the efficiency of product development, a product that realizes a multi-function printer by mounting an image reading apparatus above a single-function printer is common. For example, the multi-function printer 100B illustrated in FIG. 12A is obtained by adding an image reading apparatus 103 to an upper portion of the single-function printer 100A illustrated in FIG. 11A. The image reading apparatus 103 can read an image of a document.

As illustrated in FIG. 11B, a frame 110A of the single-function printer 100A is formed of a frame body 101. The image reading apparatus 103 of the multi-function printer 100B is larger in size than the single-function printer 100A. Therefore, the frame 110B of the multi-function printer 100B includes a frame body 101 and an extension frame body 105 additionally fixed to the frame body 101. The extension frame body 105 is made of a metal material and extends in the second direction D2 and the vertical direction D3. As a result, the stiffness of the multi-function printer 100B is secured so as to withstand the impact assumed to drop the product during transportation, and the extension frame body 105 forms the structure of the multi-function printer 100B.

However, the extension frame body 105 has substantially the same height as the side plates 101*a* and 101*b* of the frame body 1, and has substantially the same size as the product size of the multi-function printer 100B in the second direction D2. For this reason, the weight of the extension frame body 105 is heavy, the multi-function printer 100B is heavy, and the cost is increased.

Effects of First Exemplary Embodiment

In the first exemplary embodiment, as described in FIGS. 7A to 9, the third pillar portion 30 is provided in the left cover 11, and the third pillar portion 30 forms a part of the pillar structure PL1. In addition, the right cover 12 is provided with the sixth pillar portion 31, and the sixth pillar portion 31 forms a part of the pillar structure PL2. Further, the front cover 13 is engaged with the third pillar portion 30 and the sixth pillar portion 31 to form a pillar structure PL3 extending in the width direction. As described above, in the present exemplary embodiment, the left cover 11, the right cover 12, and the front cover 13, which are parts of the exterior of the casing 60 of the printer 100, are used as parts of the pillar structures PL1, PL2, and PL3, which are structures of the printer 100.

Therefore, for example, when the frame body 1 for a single-function printer is applied to a multi-function printer, the pillar 17 and the bottom frame 4, which are frame members to be added to the frame body 1, can be downsized. In addition, since the left cover 11, the right cover 12, and the front cover 13, which are parts of the exterior of the casing 60 of the printer 100, are made of a resin material, they are relatively lightweight. As a result, the printer 100 can be reduced in weight and cost while securing stiffness of the printer 100. The third pillar portion 30 of the left cover 11 and the sixth pillar portion 31 of the right cover 12 have a size of at least about several centimeters in the vertical direction D3.

In the exemplary embodiment described above, an embodiment in which the third pillar portion 30 provided in the left cover 11 forms a part of the pillar structure PL1 and the sixth pillar portion 31 provided in the right cover 12 forms a part of the pillar structure PL2 has been described. However, the present invention is not limited thereto. While the third pillar portion 30 provided in the left cover 11 may form a part of the pillar structure PL1, the sixth pillar portion 31 may not be provided in the right cover 12, and the right cover 12 may not form a part of the pillar structure PL2. Alternatively, the sixth pillar portion 31 provided on the right cover 12 may form a part of the pillar structure PL2, whereas the third pillar portion 30 may not be provided on the left cover 11, and the left cover 11 may not form a part of the pillar structure PL1.

Modification of First Exemplary Embodiment

Figure 14A:
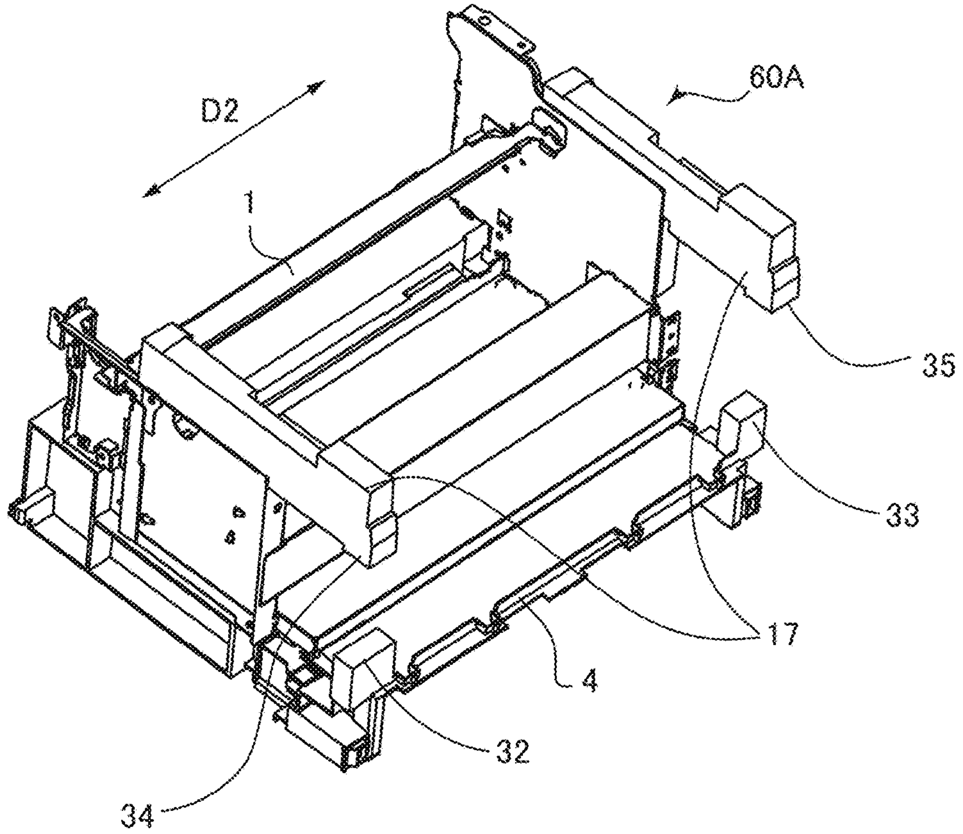
FIG. 14A is a perspective view illustrating a casing according to a first modification of the first exemplary embodiment.
Figure 14B:
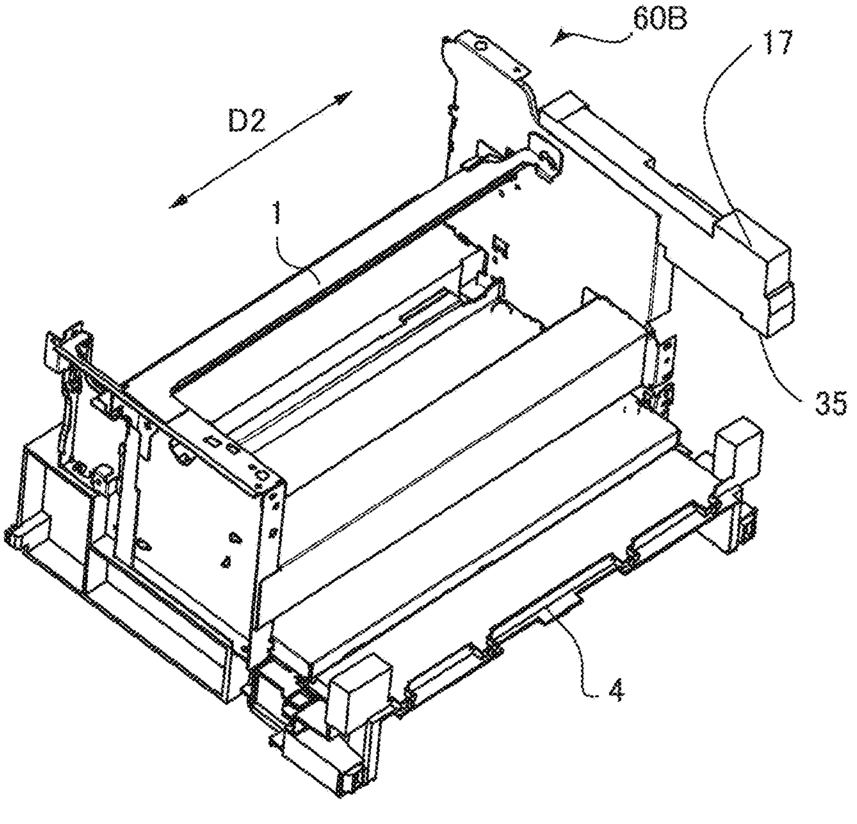
FIG. 14B is a perspective view illustrating a casing according to a second modification of the first exemplary embodiment.
Figure 15:
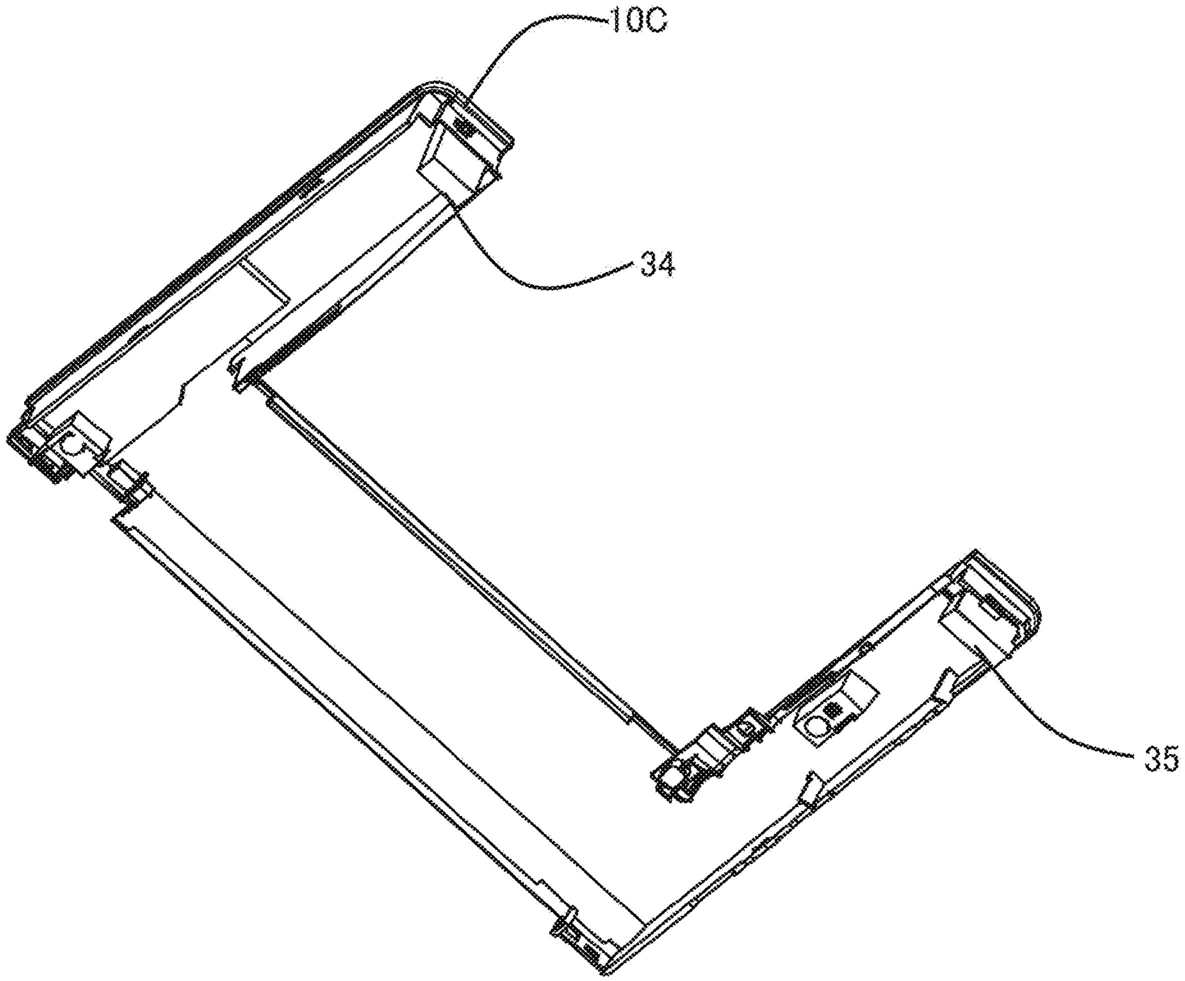
FIG. 15 is a perspective view illustrating a top cover according to a third modification of the first exemplary embodiment.
Figure 16:
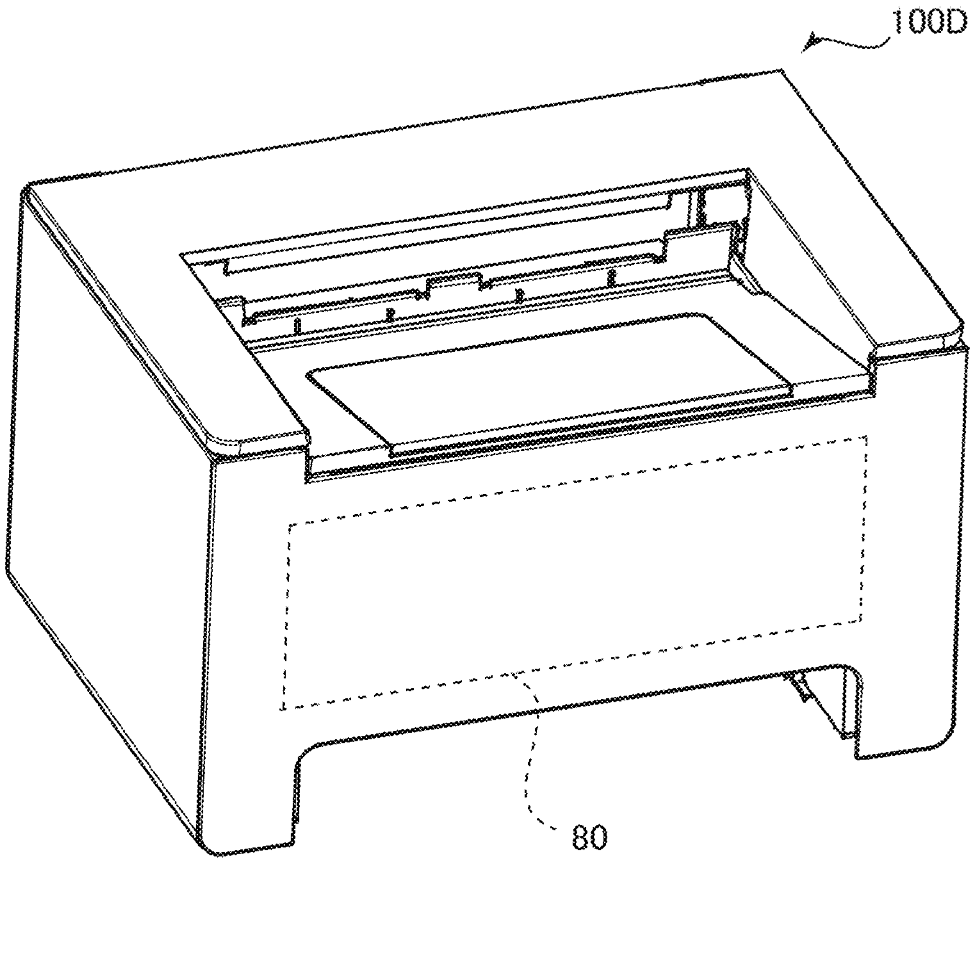
FIG. 16 is a perspective view illustrating a printer according to a fourth modification of the first exemplary embodiment.
Figure 17A:
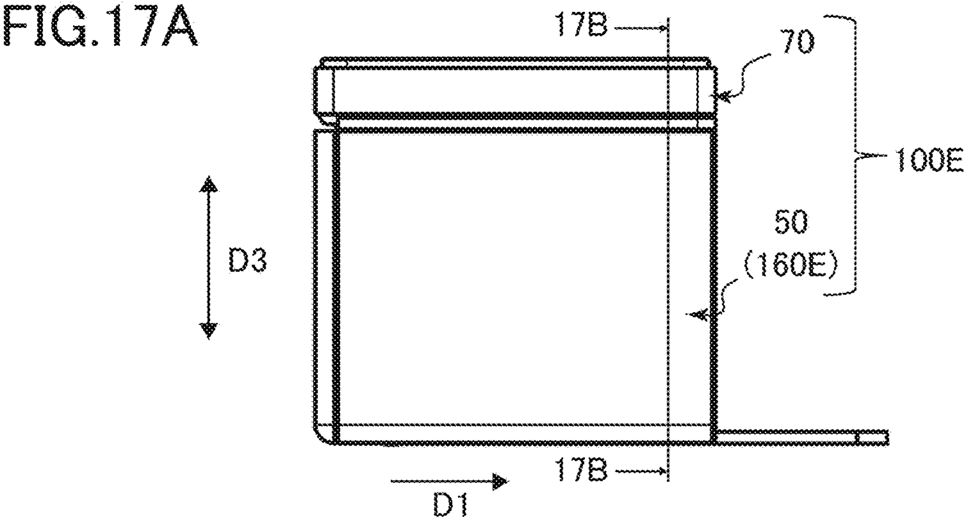
FIG. 17A is a side view illustrating a left side surface of a printer according to a fifth modification of the first exemplary embodiment.
Figure 17B:
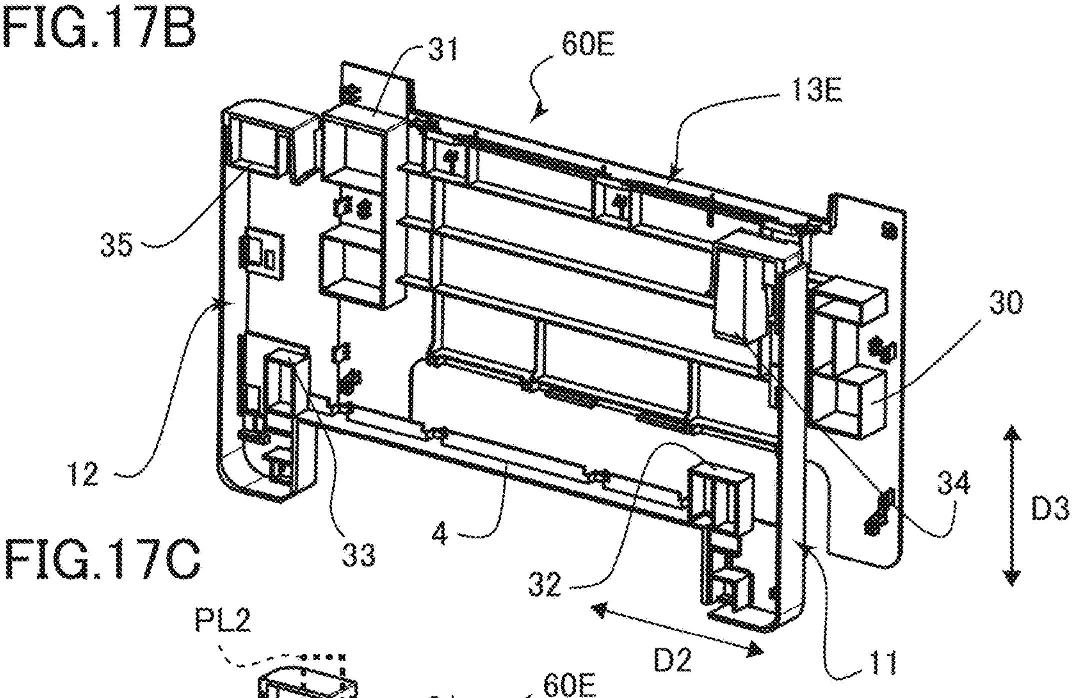
FIG. 17B is an exploded perspective view illustrating a casing when cut along line 17B-17B of FIG. 17A.
Figure 17C:
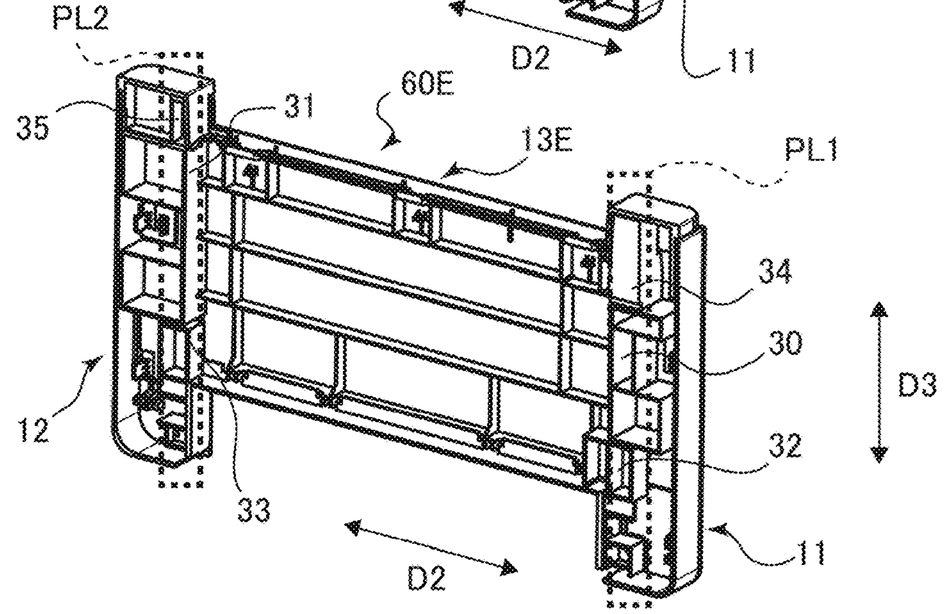
FIG. 17C is a perspective view illustrating the casing when cut along line 17B-17B of FIG. 17A.
Figure 18A:
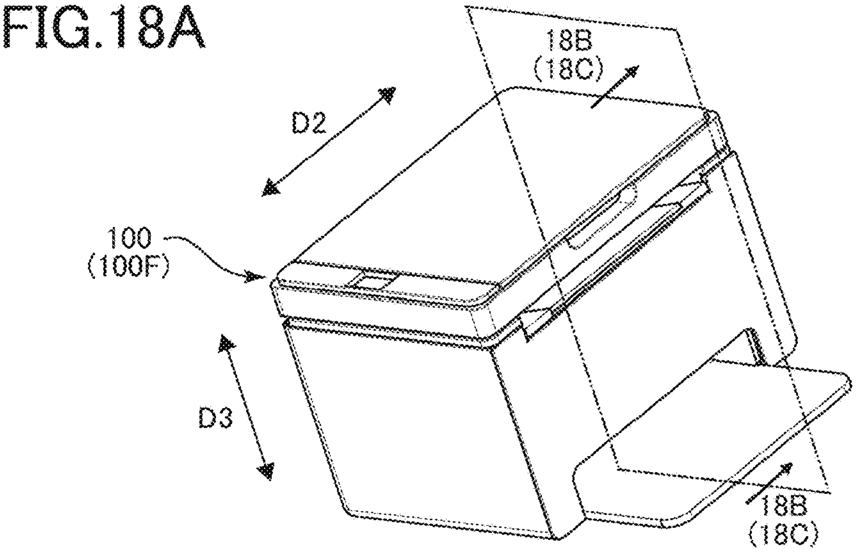
FIG. 18A is a perspective view illustrating a printer according to a sixth modification of the first exemplary embodiment.

Next, first to sixth modifications of the present exemplary embodiment will be described with reference to FIGS. 14A to 18C. FIG. 14A is a perspective view illustrating a casing 60A according to a first modification. FIG. 14B is a perspective view illustrating a casing 60B according to a second modification. FIG. 15 is a perspective view illustrating a top cover 10C according to a third modification. FIG. 16 is a perspective view illustrating a printer 100D according to a fourth modification. FIG. 17A is a side view illustrating a left side surface of a printer 100E according to a fifth modification. FIG. 17B is an exploded perspective view illustrating the casing 60E when cut along line 17B-17B of FIG. 17A, and FIG. 17C is a perspective view illustrating the casing 60E when cut along line 17B-17B of FIG. 17A. FIG. 18A is a perspective view illustrating the printer 100, 100 F.

Figure 18B:
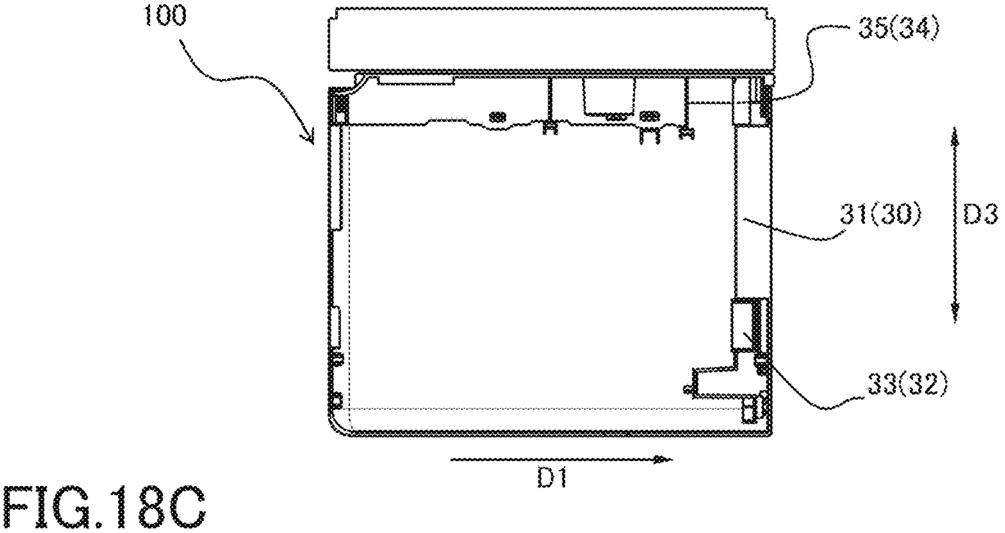
FIG. 18B is a cross-sectional view along line 18B-18B of the printer according to the first exemplary embodiment of FIG. 18A.
Figure 18C:
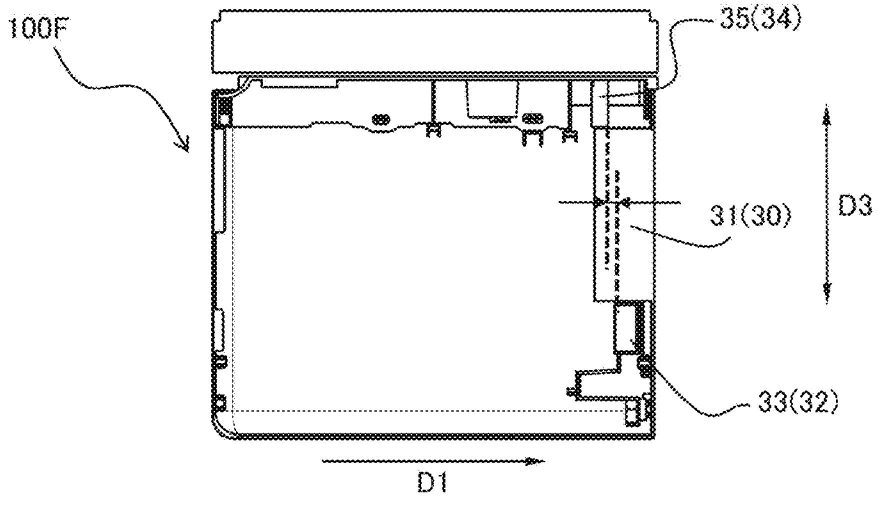
FIG. 18C is a cross-sectional view along line 18B-18B of the printer according to a sixth modification of the first exemplary embodiment of FIG. 18A.

FIG. 18B is a cross-sectional view along line 18B-18B of the printer 100 of FIG. 18A, and FIG. 18C is a cross-sectional view along line 18C-18C of a printer 100F according to a sixth modification of FIG. 18A.

In the above-described exemplary embodiment, the first pillar portion 34 on the left front side of the casing 60 is formed of a part of each of the top cover 10 and the pillar 17, and the fourth pillar portion 35 on the right front side of the casing 60 is formed of a part of the top cover 10. That is, the casing 60 has the pillar 17 only on the left side in the second direction D2.

First Modification of First Exemplary Embodiment

On the other hand, as illustrated in FIG. 14A, a casing 60A according to the first modification has the pillar 17 at both ends in the second direction D2. That is, the first pillar portion 34 and the fourth pillar portion 35 are formed of a part of the pillar 17 and a part of the top cover 10, respectively. Second modification of first exemplary embodiment As illustrated in FIG. 14B, the casing 60B according to the second modification has the pillar 17 only at the right end in the second direction D2. That is, the first pillar portion 34 is formed of a part of the top cover 10, and the fourth pillar portion 35 is formed of a part of each of the top cover 10 and the pillar 17.

Third Modification of First Exemplary Embodiment

As illustrated in FIG. 15, the top cover 10C according to the third modification includes a first pillar portion 34 and a second pillar portion 35 at both ends in second direction D2. The first pillar portion 34 and the second pillar portion 35 extend downward from the top surface of the top cover 10C and do not include the pillar 17. That is, the top cover 10C is provided so as to be able to come into contact with the third pillar portion 30 and the sixth pillar portion 31.

As described above, each of the first pillar portion 34 and the fourth pillar portion 35 may include the pillar 17 or may not include the pillar 17. The first pillar portion 34 and the fourth pillar portion 35 may or may not include the top cover 10C. In other words, at least one of the first frame 40 including the frame body 1 and the pillar 17 and the top cover 10 forms the first pillar portion 34 and the fourth pillar portion 35, respectively.

Fourth Modification of First Exemplary Embodiment

Further, in the above-described exemplary embodiment, the printer 100 having the image reading apparatus 70 above the printer body 50 has been described as an example, but the present invention is not limited thereto. For example, as illustrated in FIG. 16, a printer 100D according to the fourth modification includes the image forming unit 80, but does not include the image reading apparatus 70 illustrated in FIG. 1A. That is, the present invention may be applied not only to a multi-function printer including the image reading apparatus 70 but also to a single-function printer without the image reading apparatus 70.

Fifth Modification of First Exemplary Embodiment

As illustrated in FIGS. 17A to 17C, the third pillar portion 30 and the sixth pillar portion 31 may be formed in the front cover 13E. That is, as illustrated in FIGS. 17B and 17C, when the front cover 13E is attached to the left cover 11 and the right cover 12, the third pillar portion 30 of the front cover 13E is disposed between the first pillar portion 34 and the second pillar portion 32 in the vertical direction D3. The sixth pillar portion 31 of the front cover 13E is disposed between the fourth pillar portion 35 and the fifth pillar portion 33 in the vertical direction D3. As a result, the third pillar portion 30 and the sixth pillar portion 31 of the front cover 13E form a part of the pillar structures PL1 and PL2, respectively.

Sixth Modification of First Exemplary Embodiment

As illustrated in FIGS. 18A and 18B, the fourth pillar portion 35 and the fifth pillar portion 33 of the first exemplary embodiment are disposed so as to overlap each other in the first direction D1. Similarly, the first pillar portion 34 and the second pillar portion 32 are disposed so as to overlap each other in the first direction D1. In other words, the fourth pillar portion 35 and the fifth pillar portion 33 are disposed so as to at least partially overlap each other when viewed in the vertical direction D3. The first pillar portion 34 and the second pillar portion 32 are disposed so as to at least partially overlap each other when viewed in the vertical direction D3.

However, the fourth pillar portion 35, the fifth pillar portion 33, the first pillar portion 34, and the second pillar portion 32 are not limited to such arrangements. For example, as illustrated in FIG. 18C, the fourth pillar portion 35 and the fifth pillar portion 33 of the casing 60 according to the sixth modification are disposed so as not to overlap each other in the first direction D1. Similarly, the first pillar portion 34 and the second pillar portion 32 are disposed so as not to overlap each other in the first direction D1. In other words, the fourth pillar portion 35 and the fifth pillar portion 33 are disposed so as not to overlap each other when viewed in the vertical direction D3. The first pillar portion 34 and the second pillar portion 32 are disposed so as not to overlap each other when viewed in the vertical direction D3.

At this time, the sixth pillar portion 31 is disposed so as to overlap the fourth pillar portion 35 and the fifth pillar portion 33 in the first direction D1. The third pillar portion 30 is disposed so as to overlap the first pillar portion 34 and the second pillar portion 32 in the first direction D1.

Second Exemplary Embodiment

Pillar Structure of Casing of Second Exemplary Embodiment

Figure 19A:
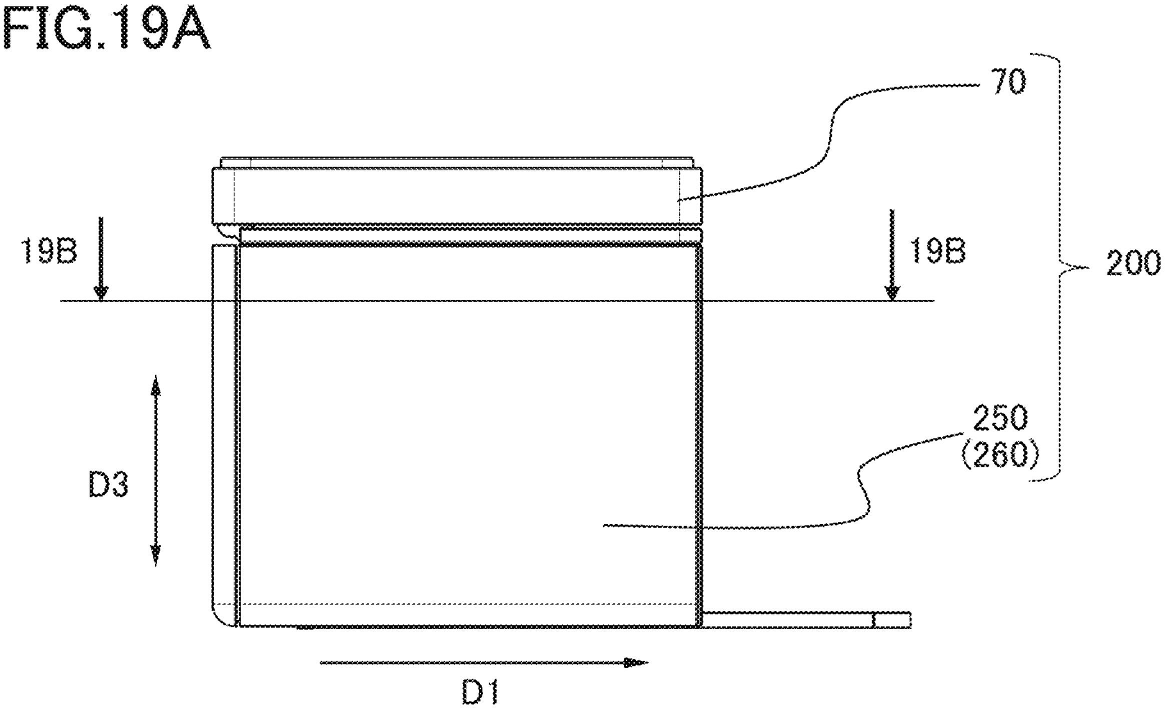
FIG. 19A is a side view illustrating a left side surface of a printer according to a second exemplary embodiment.
Figure 19B:
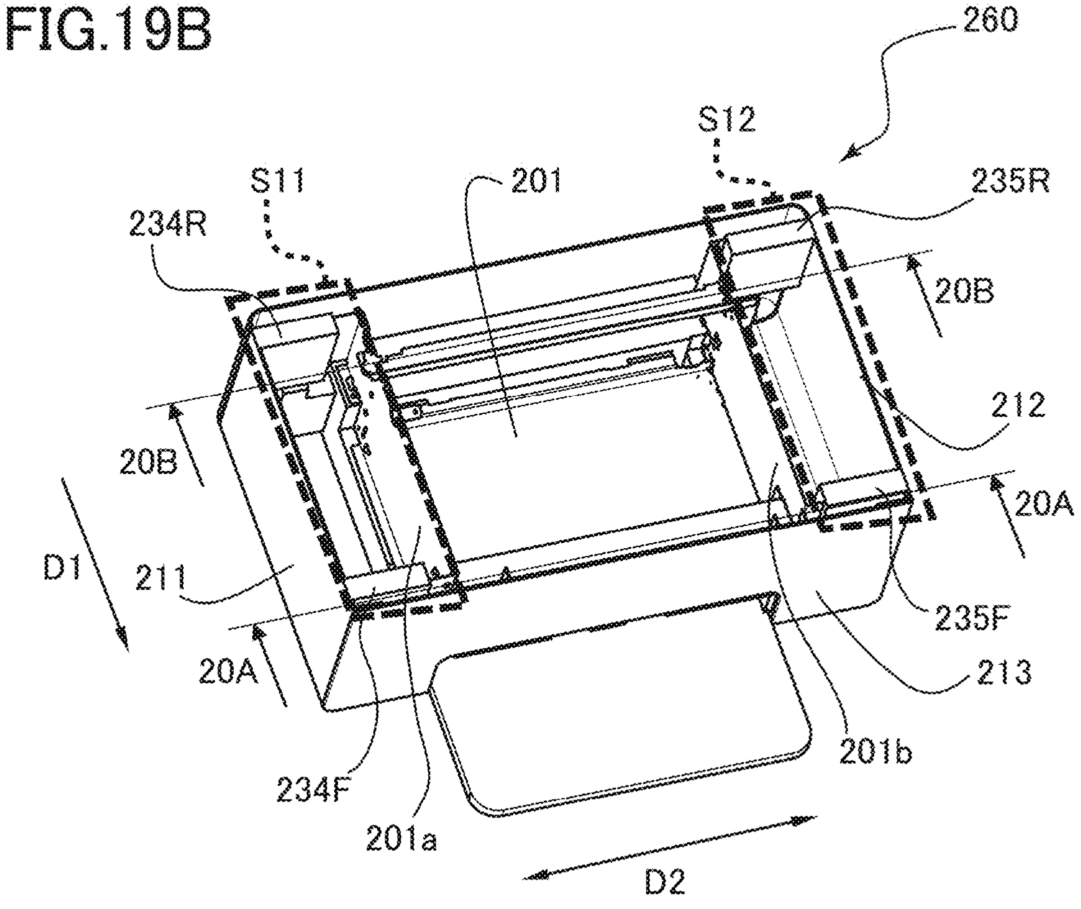
FIG. 19B is a perspective view illustrating a casing cut along line 19B-19B of FIG. 19A.
Figure 20A:
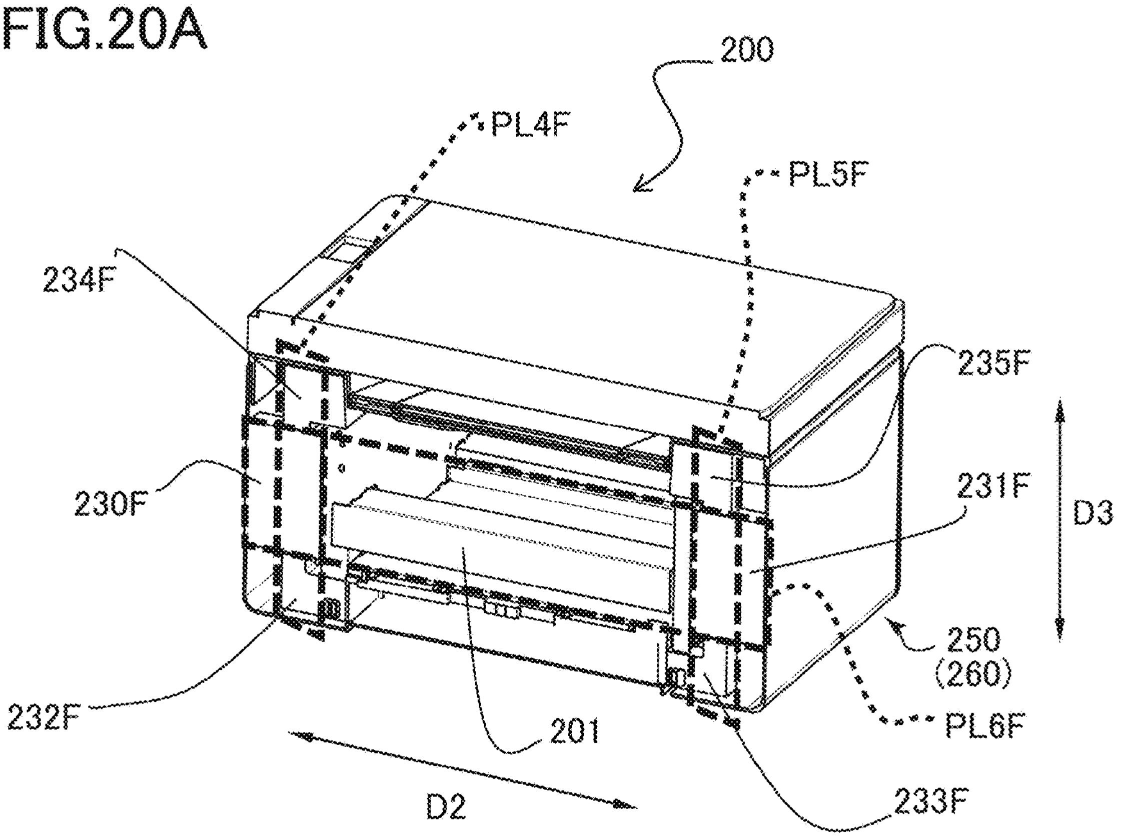
FIG. 20A is a perspective view illustrating the printer cut along line 20A-20A of FIG. 19B.
Figure 20B:
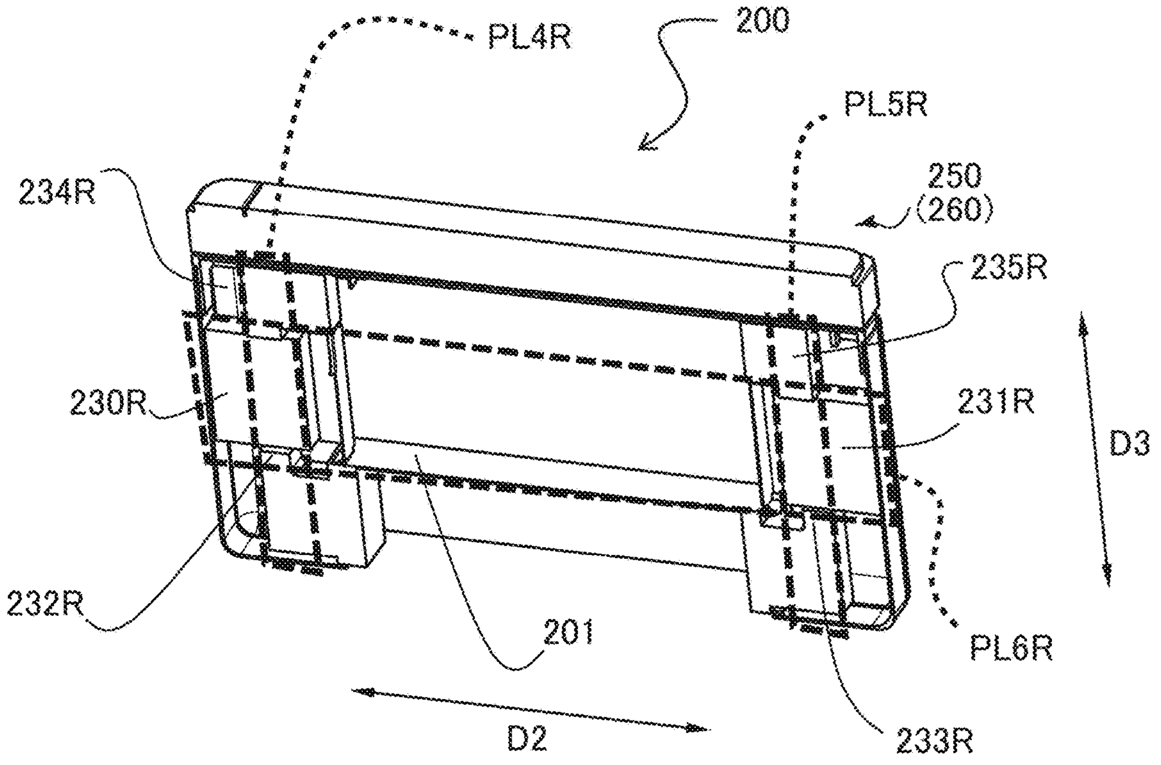
FIG. 20B is a perspective view illustrating the printer cut along line 20B-20B of FIG. 20B.
Figure 21A:
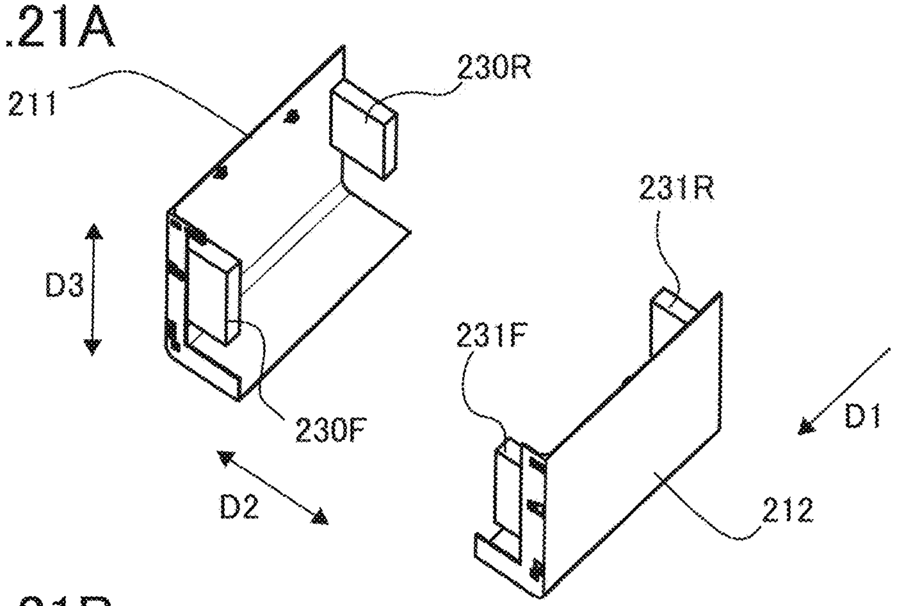
FIG. 21A is a perspective view illustrating a left cover and a right cover.
Figure 21B:
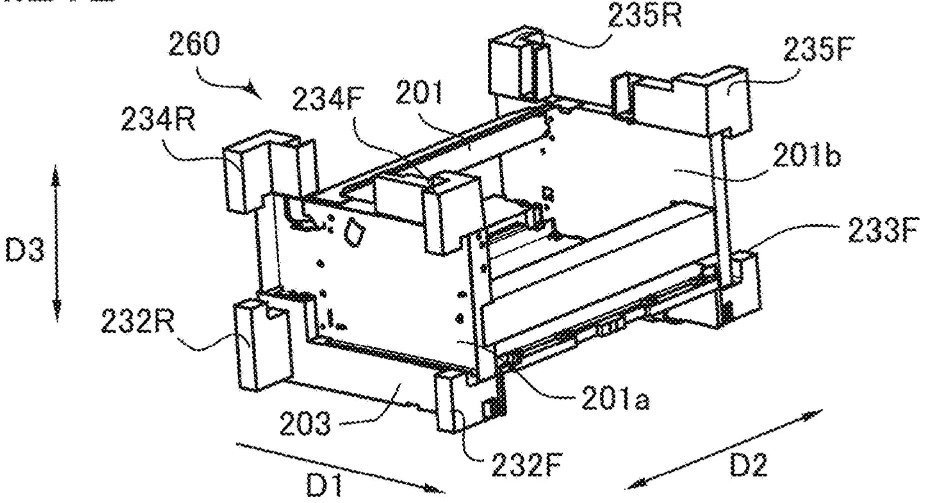
FIG. 21B is a perspective view illustrating a casing.
Figure 21C:
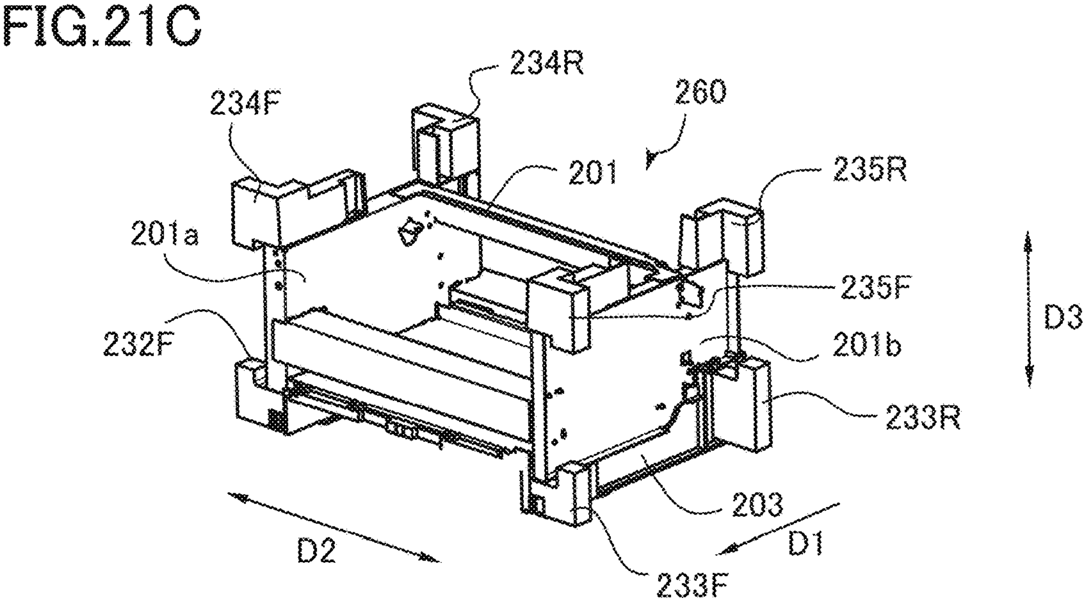
FIG. 21C is another perspective view illustrating the casing.

Next, a pillar structure of the casing 260 of the printer body 250 according to the second exemplary embodiment will be described with reference to FIGS. 19A to 21C. FIG. 19A is a side view illustrating a left side surface of the printer 200 according to the second exemplary embodiment, and FIG. 19B is a perspective view illustrating the casing 260 cut along line 19B-19B of FIG. 19A. FIG. 20A is a perspective view illustrating the printer 200 cut along line 20A-20A of FIG. 19B, and FIG. 20B is a perspective view illustrating the printer 200 cut along line 20B-20B of FIG. 19B. FIG. 21A is a perspective view illustrating the left cover 211 and the right cover 212. FIG. 21B is a perspective view illustrating the casing 260, and FIG. 21C is another perspective view illustrating the casing 260.

In the first exemplary embodiment, as illustrated in FIGS. 2A to 2C, in the left front portion of the casing 60, the pillar 17 and the bottom frame 4 extend downstream of the side plate 1*a* in the first direction D1. A space is provided in a region surrounded by the pillar 17, the side plate 1*a*, and the bottom frame 4, and the third pillar portion 30 provided in the left cover 11 enters the space.

In the second exemplary embodiment, as illustrated in FIG. 19B, a space S11 is provided between the frame body 201 and the left cover 211 on one side in the second direction D2 of the casing 260. More specifically, a space S11 is provided between the left side plate 201*a* of the frame body 201 and the left cover 211. The left cover 211 extends along the first direction D1 and the vertical direction D3, forms one side surface of the casing 260, and covers the side plate 201*a*. On the other side in the second direction D2 of the casing 260, a space S12 is provided between the frame body 201 and the right cover 212. More specifically, a space S12 is provided between the right side plate 201*b* of the frame body 201 and the right cover 212. Then, a configuration in which the printer body 250 withstands the load in the second direction D2 and the vertical direction D3 by providing a pillar structure to be described later in the spaces S11 and S12 will be described.

As illustrated in FIGS. 19A to 21C, the frame of the casing 260 includes a frame body 201 as a first frame and a feeding frame 203 as a second frame. The side plates 201*a* and 201*b* of the frame body 201 are made of a metal material such as a sheet metal, and the first pillar portions 234F and 234R and the fourth pillar portions 235F and 235R, which will be described later, of the frame body 201 and the feeding frame 203 are made of a resin material. The exterior of the casing 260 includes a top cover, a left cover 211, a right cover 212, a front cover 213, an inner rear cover, an inner cover, a sheet discharge tray, and a rear cover 214, which are made of a resin material.

The front cover 213 is a cover that extends in the second direction D2 and the vertical direction D3 and is disposed downstream of the photosensitive drum 44 (see FIG. 13) in the first direction D1. The rear cover 214 is a cover that extends in the second direction D2 and the vertical direction D3 and is disposed upstream of the photosensitive drum 44 (see FIG. 13) in the first direction D1.

As illustrated in FIG. 21A, the left cover 211 includes third pillar portions 230F and 230R protruding toward the inside of the printer body 250, that is, toward the right cover 212 in the second direction D2. The right cover 212 includes sixth pillar portions 231F and 231R protruding toward the inside of the printer body 250, that is, toward the left cover 211 in the second direction D2. The left cover 211 and the right cover 212 are made of a resin material.

Note that, in the following description, a member denoted by reference numeral "F" or "R" at the end is a member provided in pair, and indicates that one member denoted by reference numeral "F" is disposed downstream of the other member denoted by reference numeral "R" in the first direction D1. For example, a third pillar portion 230F is disposed downstream of a third pillar portion 230R in first direction D1, and a sixth pillar portion 231F is disposed downstream of a sixth pillar portion 231R in first direction D1.

As illustrated in FIGS. 21B and 21C, first pillar portions 234F and 234R and fourth pillar portions 235F and 235R are provided in an upper portion of the frame body 201. The first pillar portions 234F and 234R extend from the left side plate 201*a* in a direction away from the right side plate 201*b*, and the fourth pillar portions 235F and 235R extend from the right side plate 201*b* in a direction away from the left side plate 201*a*. That is, the first pillar portions 234F and 234R and the fourth pillar portions 235F and 235R extend toward the outside of the printer body 250 in the second direction D2.

The feeding frame 203 attached to the lower portion of the frame body 201 is provided with second pillar portions 232F and 232R and fifth pillar portions 233F and 233R. The second pillar portions 232F and 232R and the fifth pillar portions 233F and 233R extend toward the outside of the printer body 250 in the second direction D2. The side plates 201*a* and 201*b* of the frame body 201 are made of a metal material such as a sheet metal. The first pillar portions 234F and 234R, the fourth pillar portions 235F and 235R, and the feeding frame 203 provided in the frame body 201 are made of a resin material.

The first pillar portions 234F and 234R and the second pillar portions 232F and 232R are disposed on one end side, that is a first end side, in the second direction D2 of the printer body 250, that is, on the left side. The fourth pillar portions 235F and 235R and the fifth pillar portions 233F and 233R are disposed on the other end side, that is a second end side, in the second direction D2 of the printer body 250, that is, on the right side.

As illustrated in FIGS. 20A and 20B, the operator assembles the left cover 211 and the right cover 212 to the frame body 201. Then, as illustrated in FIG. 20A, the third pillar portion 230F is disposed between the first pillar portion 234F and the second pillar portion 232F in the vertical direction D3, and can come into contact with the first pillar portion 234F and the second pillar portion 232F. In addition, the third pillar portion 230F is provided at a position at least partially overlapping the first pillar portion 234F and the second pillar portion 232F as viewed in the vertical direction D3. The first pillar portion 234F, the second pillar portion 232F, and the third pillar portion 230F form a pillar structure PL4F at the left front portion of the casing 260.

Similarly, as illustrated in FIG. 20B, the third pillar portion 230R is disposed between the first pillar portion 234R and the second pillar portion 232R in the vertical direction D3, and can come into contact with the first pillar portion 234R and the second pillar portion 232R. In addition, the third pillar portion 230R is provided at a position at least partially overlapping the first pillar portion 234R and the second pillar portion 232R as viewed in the vertical direction D3. The first pillar portion 234R, the second pillar portion 232R, and the third pillar portion 230R form a pillar structure PL4R of the left rear portion of the casing 260.

As illustrated in FIG. 20A, the sixth pillar portion 231F is disposed between the fourth pillar portion 235F and the fifth pillar portion 233F in the vertical direction D3, and can come into contact with the fourth pillar portion 235F and the fifth pillar portion 233F. In addition, the sixth pillar portion 231F is provided at a position at least partially overlapping the fourth pillar portion 235F and the fifth pillar portion 233F as viewed in the vertical direction D3. The fourth pillar portion 235F, the fifth pillar portion 233F, and the sixth pillar portion 231F form a pillar structure PL5F at the right front portion of the casing 260.

Similarly, as illustrated in FIG. 20B, the sixth pillar portion 231R is disposed between the fourth pillar portion 235R and the fifth pillar portion 233R in the vertical direction D3, and can come into contact with the fourth pillar portion 235R and the fifth pillar portion 233R. In addition, the sixth pillar portion 231R is provided at a position at least partially overlapping the fourth pillar portion 235R and the fifth pillar portion 233R as viewed in the vertical direction D3. The fourth pillar portion 235R, the fifth pillar portion 233R, and the sixth pillar portion 231R form a pillar structure PL5R on the right rear part of the casing 260.

The pillar structures PL4F, PL4R, PL5F, and PL5R form a part of the structure of the printer body 250, and can receive an external force particularly in the vertical direction D3 when the external force acts on the printer body 250. For example, the load acting on the fourth pillar portion 235F from above can be received by the fifth pillar portion 233F via the sixth pillar portion 231F, and the load can be dispersed throughout the casing 260.

As illustrated in FIGS. 19A to 21C, the first pillar portions 234F and 234R, the second pillar portions 232F and 232R, and the third pillar portions 230F and 230R are disposed on the side opposite to the photosensitive drum 44 (see FIG. 13) with respect to the side plate 201*a* in the second direction D2. Similarly, the fourth pillar portions 235F and 235R, the fifth pillar portions 233F and 233R, and the sixth pillar portions 231F and 231R are disposed on the side opposite to the photosensitive drum 44 (see FIG. 13) with respect to the side plate 201*b* in the second direction D2.

As illustrated in FIG. 20A, the third pillar portion 230F and the sixth pillar portion 231F are engaged with the frame body 201 in the second direction D2, and a part of the third pillar portion 230F, the sixth pillar portion 231F, and the frame body 201 forms a pillar structure PL6F. Similarly, as illustrated in FIG. 20B, the third pillar portion 230R and the sixth pillar portion 231R are engaged with the frame body 201 in the second direction D2, and the third pillar portion 230R, the sixth pillar portion 231R, and a part of the frame body 201 form a pillar structure PL6R. The pillar structures PL6F and PL6R form a part of the structure of the printer body 250, and can receive an external force particularly in the second direction D2 when the external force acts on the printer body 250.

In the present exemplary embodiment, the third pillar portions 230F and 230R and the sixth pillar portions 231F and 231R are engaged with the frame body 201 in the second direction D2, but the present invention is not limited thereto. For example, the third pillar portions 230F and 230R and the sixth pillar portions 231F and 231R may be engaged with the feeding frame 203 in the second direction D2 to form the pillar structures PL6F and PL6R.

Effects of Second Exemplary Embodiment

In the present exemplary embodiment, the left cover 211 and the right cover 212, which are parts of the exterior of the casing 260 of the printer 200, are used as parts of the pillar structures PL4F, PL4R, PL5F, PL5R, PL6F, and PL6R, which are structures of the printer body 250. The first pillar portions 234F and 234R, the fourth pillar portions 235F and 235R, the second pillar portions 232F and 232R, and the fifth pillar portions 233F and 233R extend toward the outside of the printer body 250 in the second direction D2.

For example, a case in which a frame body for a single-function printer is shared with a frame body for a multi-function printer having a larger product size in the second direction D2 than that of the single-function printer will be considered. At this time, with respect to the frame body for the single-function printer, the first pillar portions 234F and 234R and the fourth pillar portions 235F and 235R are added to the side plates 201*a* and 201*b* of the frame body, and the feeding frame 203 is added. As described above, a part of the left cover 211 and a part of the right cover 212 made of a resin material are used as a part of the pillar structures PL4F, PL4R, PL5F, PL5R, PL6F, and PL6R. Therefore, it is possible to realize weight reduction and cost reduction of the printer 200 while securing stiffness of the printer 200.

First Modification of Second Exemplary Embodiment

Figure 22:
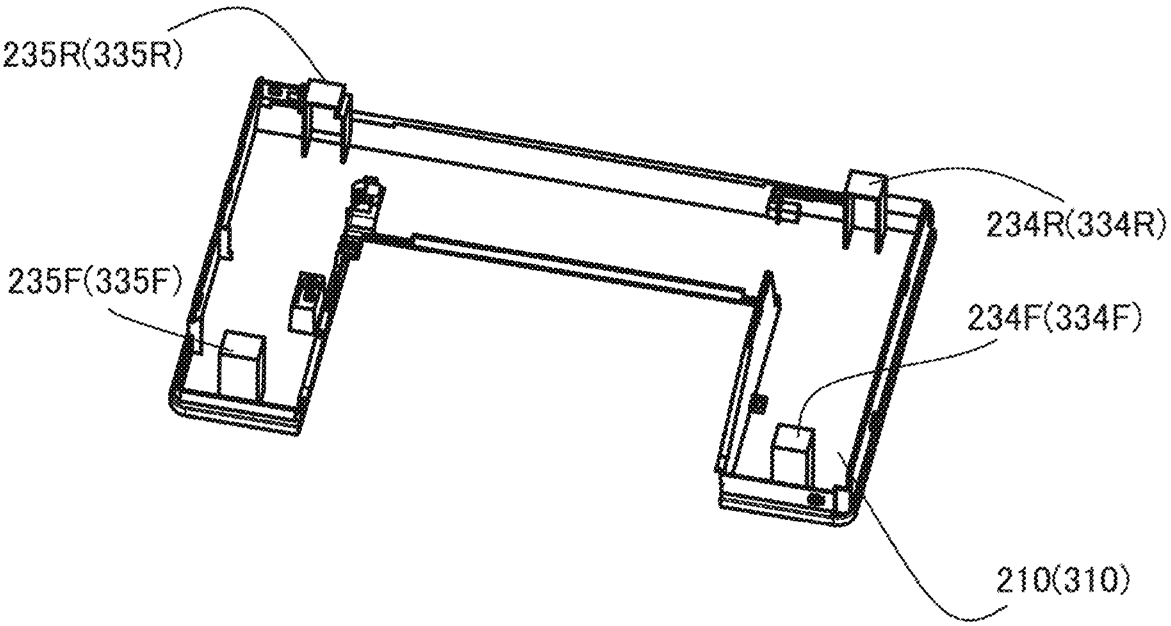
FIG. 22 is a perspective view illustrating a top cover according to a first modification of the second exemplary embodiment and a first modification of the third exemplary embodiment.

In the second exemplary embodiment, the first pillar portions 234F and 234R and the fourth pillar portions 235F and 235R are provided in the frame body 201, but the present invention is not limited thereto. FIG. 22 is a perspective view illustrating top cover 210 according to a first modification. For example, in a first modification of the second exemplary embodiment, the top cover 210 illustrated in FIG. 22 may be attached to an upper portion of the frame body 201. That is, first pillar portions 234F and 234R and fourth pillar portions 235F and 235R may be provided in the top cover 210 instead of the frame body 201.

Second Modification of Second Exemplary Embodiment

Figure 23A:
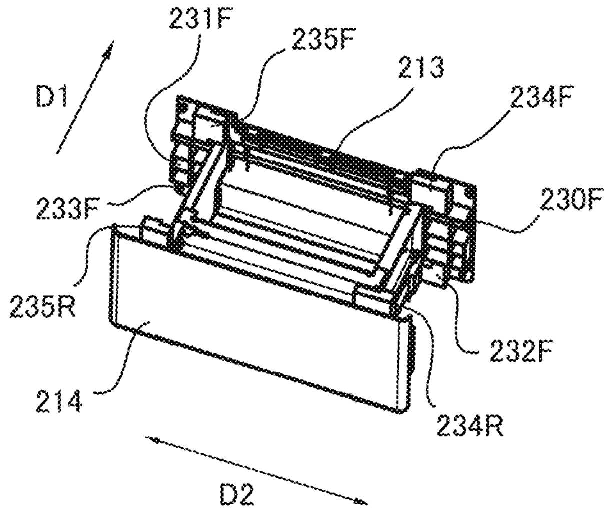
FIG. 23A is a perspective view illustrating a front cover according to a second modification of the second exemplary embodiment.
Figure 23B:
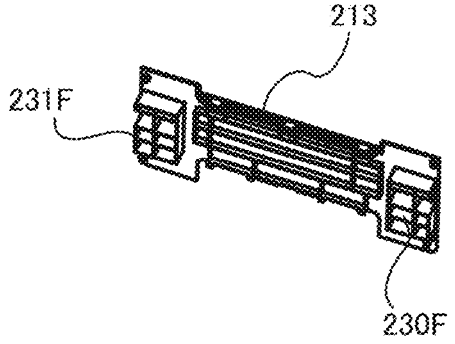
FIG. 23B is a perspective view illustrating a front cover according to a second modification of the second exemplary embodiment.
Figure 23C:
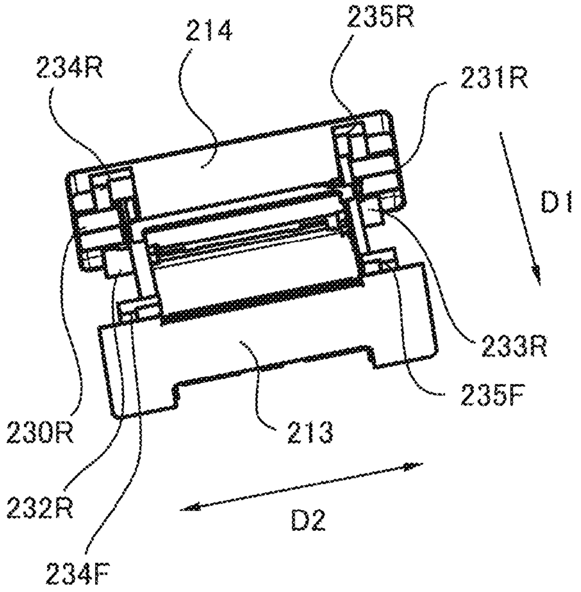
FIG. 23C is a perspective view illustrating a rear cover according to the second modification of the second exemplary embodiment.
Figure 23D:
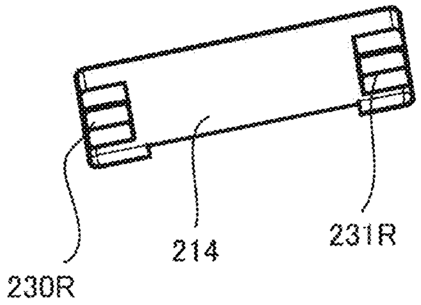
FIG. 23D is a perspective view illustrating a rear cover according to the second modification.

In the second exemplary embodiment, the third pillar portions 230F and 230R and the sixth pillar portions 231F and 231R are provided in the left cover 211 and the right cover 212, but the present invention is not limited thereto. FIGS. 23A and 23B are perspective views illustrating a front cover 213 according to a second modification, and FIGS. 23C and 23D are perspective views illustrating a rear cover 214 according to the second modification. For example, in the second modification of the second exemplary embodiment, the front cover 213 illustrated in FIGS. 23A and 23B and the rear cover 214 illustrated in FIGS. 23C and 23D may be attached to the front and rear of the frame body 201.

As illustrated in FIGS. 23A and 23B, the front cover 213 includes a third pillar portion 230F and a sixth pillar portion 231F. As illustrated in FIGS. 23C and 23D, the rear cover 214 includes a third pillar portion 230R and a sixth pillar portion 231R. That is, instead of the left cover 211 and the right cover 212, the third pillar portions 230F and 230R and the sixth pillar portions 231F and 231R may be provided on the front cover 213 and the rear cover 214.

Third Exemplary Embodiment

Pillar Structure of Casing of Third Exemplary Embodiment

Figure 24A:
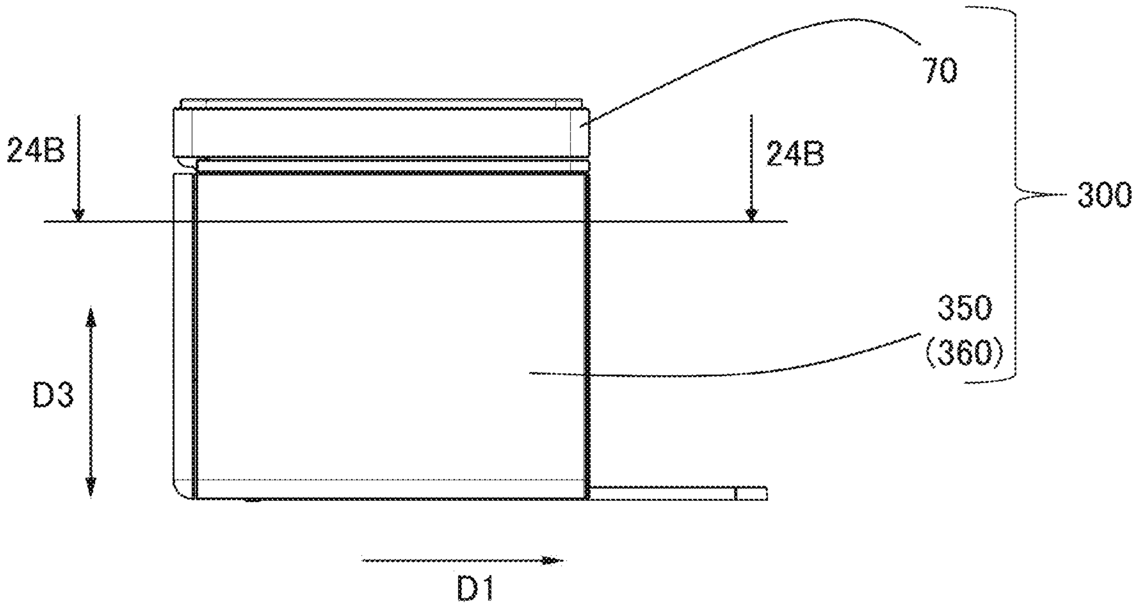
FIG. 24A is a side view illustrating a left side surface of a printer according to a third exemplary embodiment.
Figure 24B:
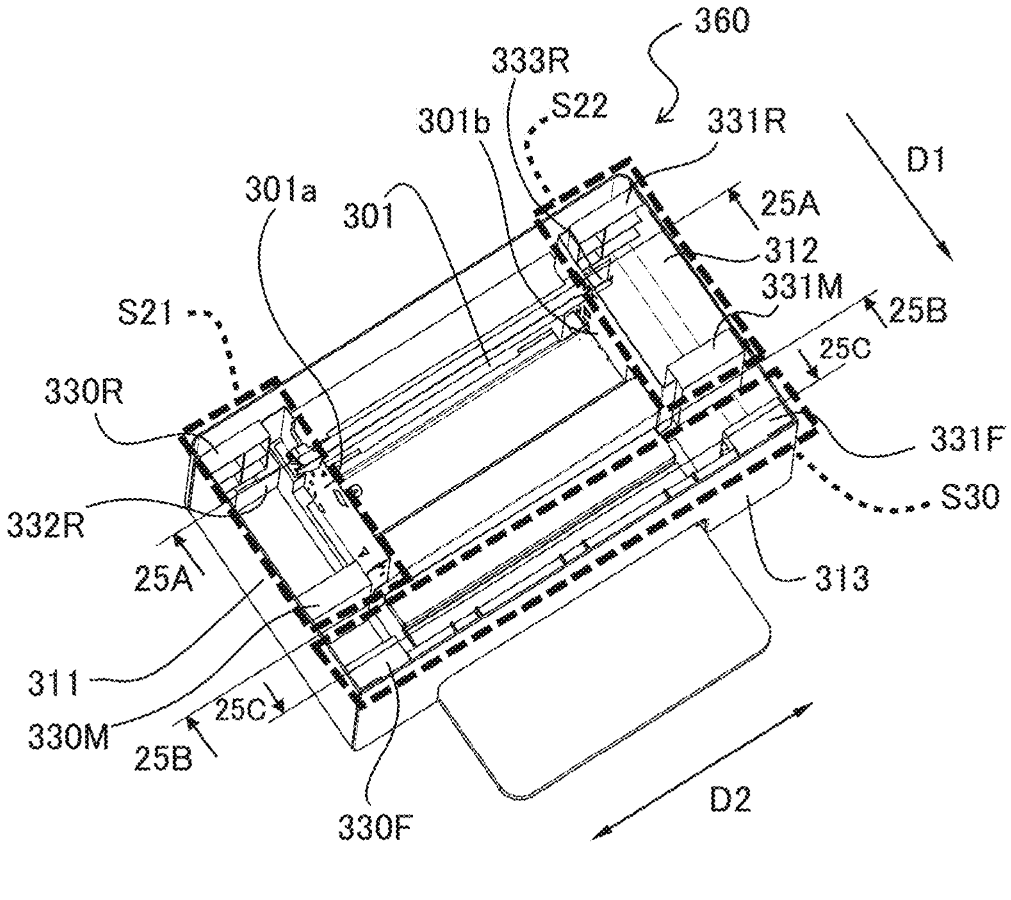
FIG. 24B is a perspective view illustrating a casing cut along line 24B-24B of FIG. 24A.
Figure 25A:
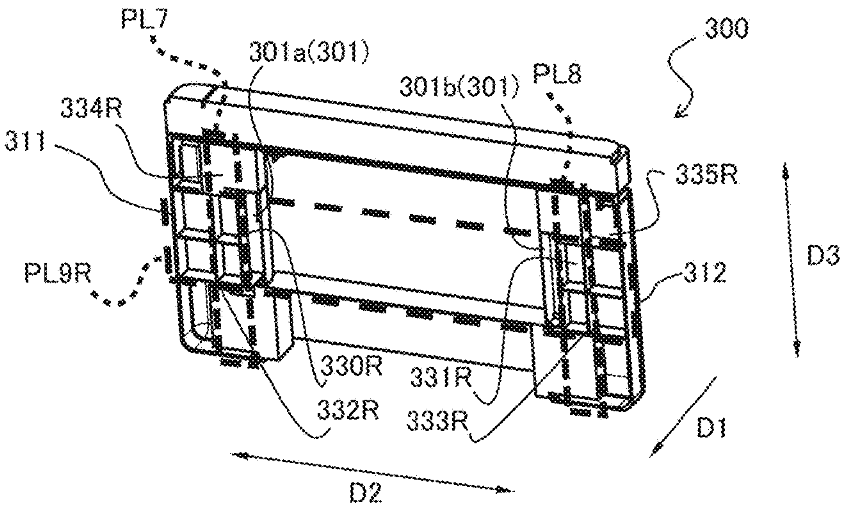
FIG. 25A is a perspective view illustrating the printer cut along line 25A-25A of FIG. 24B.
Figure 25B:
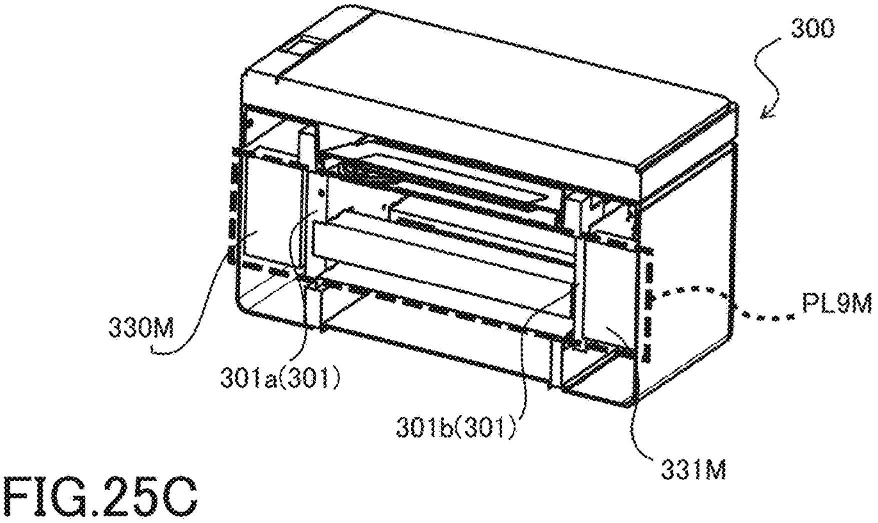
FIG. 25B is a perspective view illustrating the printer cut along line 25B-25B of FIG. 25B.
Figure 25C:
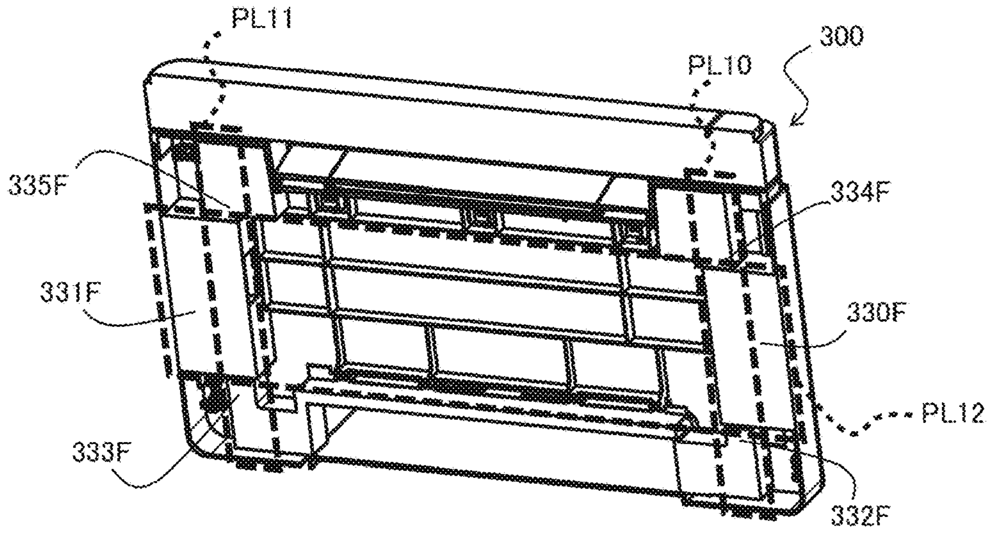
FIG. 25C is a perspective view illustrating the printer cut along line 25C-25C of FIG. 25B.
Figure 26A:
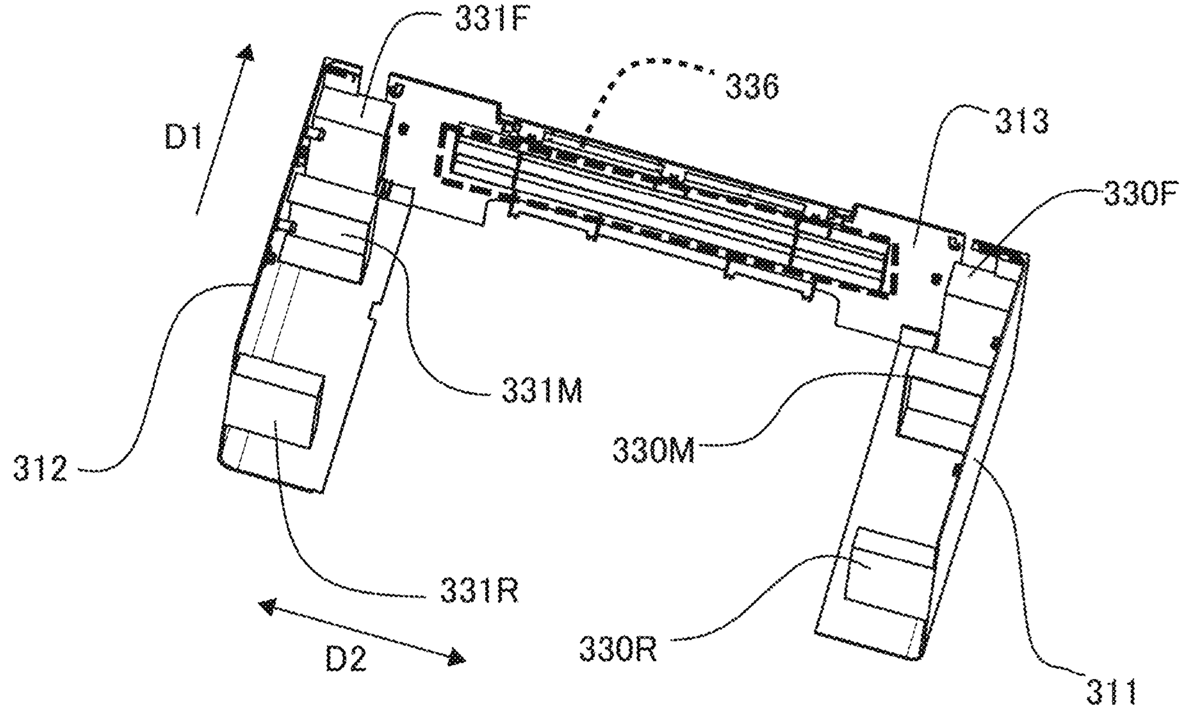
FIG. 26A is an exploded perspective view illustrating a left cover, a right cover, and a front cover.
Figure 26B:
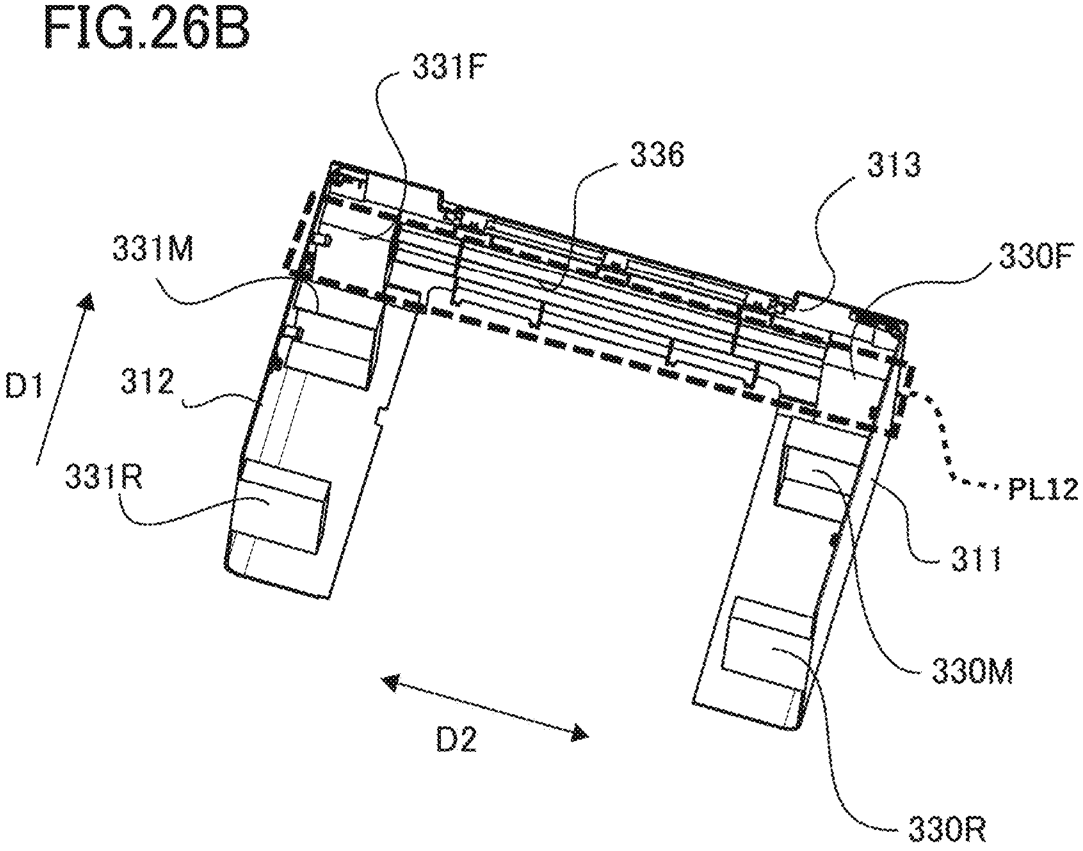
FIG. 26B is a perspective view illustrating a state in which the left cover, the right cover, and the front cover are assembled.
Figure 27A:
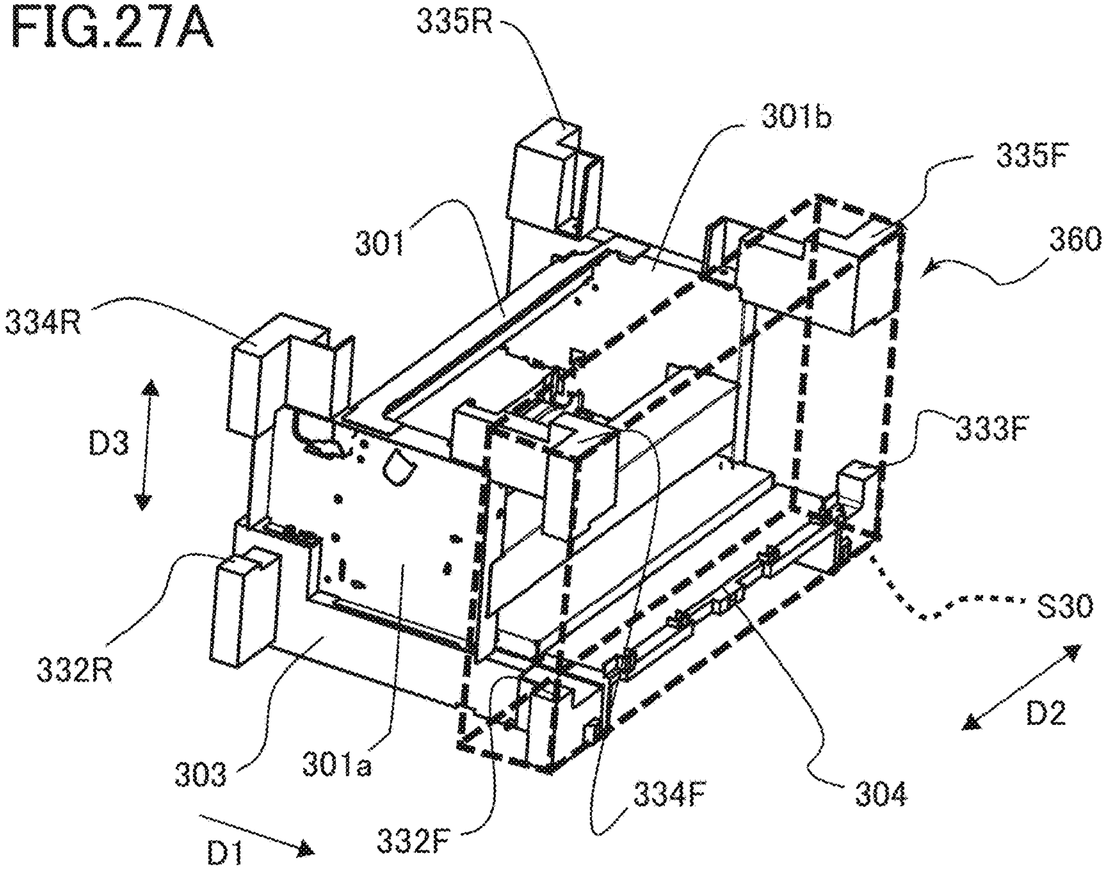
FIG. 27A is a perspective view illustrating a casing.
Figure 27B:
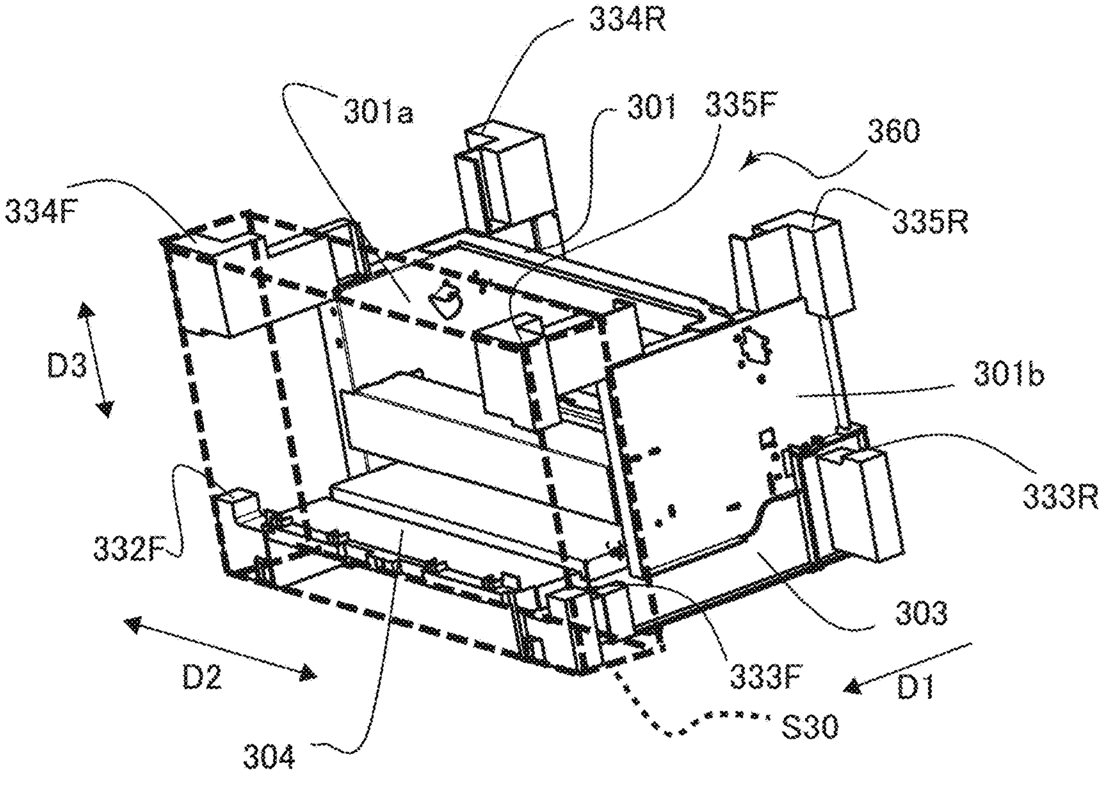
FIG. 27B is another perspective view illustrating the casing.

Next, a pillar structure of the casing 360 of the printer body 350 according to the third exemplary embodiment will be described with reference to FIGS. 24A to 27B. FIG. 24A is a side view illustrating a left side surface of the printer 300 according to the third exemplary embodiment, and FIG. 24B is a perspective view illustrating the casing 360 cut along line 24B-24B of FIG. 24A. FIG. 25A is a perspective view illustrating the printer 300 cut along line 25A-25A of FIG. 24B, and FIG. 25B is a perspective view illustrating the printer 300 cut along line 25B-25B of FIG. 24B. FIG. 25C is a perspective view illustrating the printer 300 cut along line 25C-25C of FIG. 24B. FIG. 26A is an exploded perspective view illustrating the left cover 311, the right cover 312, and the front cover 313, and FIG. 26B is a perspective view illustrating a state in which the left cover 311, the right cover 312, and the front cover 313 are assembled. FIG. 27A is a perspective view illustrating the casing 360, and FIG. 27B is another perspective view illustrating the casing 360.

In the third exemplary embodiment, as illustrated in FIG. 24B, a space S21 is provided between the frame body 301 and the left cover 311 on one side in the second direction D2 of the casing 360. More specifically, a space S21 is provided between the left side plate 301*a* of the frame body 301 and the left cover 311. The left cover 311 extends along the first direction D1 and the vertical direction D3, forms one side surface of the casing 360, and covers the side plate 301*a*. On the other side in the second direction D2 of the casing 360, a space S22 is provided between the frame body 301 and the right cover 312. More specifically, a space S22 is provided between the right side plate 301*b* of the frame body 301 and the right cover 312. Furthermore, a space S30 is provided downstream of the frame body 301 in the first direction D1. More specifically, a space S30 is provided between the frame body 301 and the front cover 313. Then, a configuration in which the printer body 350 withstands the load in the second direction D2 and the vertical direction D3 by providing a pillar structure to be described later in the spaces S21, S22, and S30 will be described.

As illustrated in FIGS. 24A to 27B, the frame of the casing 360 includes a frame body 301 as a first frame, and a feeding frame 303 and a bottom frame 304 as second frames. The side plates 301*a* and 301*b* of the frame body 301 are made of a metal material such as sheet metal, and the first pillar portions 334F and 334R and the fourth pillar portions 335F and 335R, which will be described later, of the frame body 301, and the feeding frame 303 and the bottom frame 304 are made of a resin material. The exterior of the casing 360 includes a top cover, a left cover 311, a right cover 312, a front cover 313, an inner rear cover, an inner cover, a sheet discharge tray, and a rear cover 314, which are made of a resin material.

The front cover 313 is a cover that extends in the second direction D2 and the vertical direction D3 and is disposed downstream of the photosensitive drum 44 (see FIG. 13) in the first direction D1. The rear cover 314 is a cover that extends in the second direction D2 and the vertical direction D3 and is disposed upstream of the photosensitive drum 44 (see FIG. 13) in the first direction D1.

As illustrated in FIGS. 27A and 27B, the feeding frame 303 and the bottom frame 304 are attached to a lower portion of the frame body 301 of the casing 360. The bottom frame 304 extends downstream of the side plates 301*a* and 301*b* of the frame body 301 in the first direction D1. First pillar portions 334F and 334R and fourth pillar portions 335F and 335R are provided in an upper portion of frame body 301. The first pillar portions 334F and 334R extend from the left side plate 301*a* in a direction away from the right side plate 301*b*. The first pillar portion 334F extends downstream in the first direction D1 from the side plate 301*a*. The fourth pillar portions 335F and 335R extend from the right side plate 301*b* in a direction away from the left side plate 301*a*. The fourth pillar portion 335F extends downstream in the first direction D1 from the side plate 301*b*. That is, the first pillar portions 334F and 334R and the fourth pillar portions 335F and 335R extend toward the outside of the printer body 250 in the second direction D2, and the first pillar portion 334F and the fourth pillar portion 335F extend downstream in the first direction D1.

The feeding frame 303 attached to the lower portion of the frame body 301 is provided with a second pillar portion 332R and a fifth pillar portion 333R. The second pillar portion 332R and the fifth pillar portion 333R extend toward the outside of the printer body 250 in the second direction D2. The bottom frame 304 attached to the lower portion of the frame body 301 is provided with a second pillar portion 332F and a fifth pillar portion 333F. The second pillar portion 332F and the fifth pillar portion 333F extend toward the outside of the printer body 250 in the second direction D2 and downstream in the first direction D1.

The second pillar portions 332F and 332R and the fifth pillar portions 333F and 333R are disposed right below the first pillar portions 334F and 334R and the fourth pillar portions 335F and 335R, respectively. The side plates 301*a* and 301*b* of the frame body 301 are made of a metal material such as a sheet metal. The first pillar portions 334F and 334R, the fourth pillar portions 335F and 335R, the feeding frame 303, and the bottom frame 304 provided in the frame body 301 are made of a resin material.

Further, as illustrated in FIG. 24B and FIGS. 26A and 26B, the left cover 311 includes third pillar portions 330F, 330M, and 330R protruding toward the inside of the printer body 350, that is, toward the right cover 312 in the second direction D2. The right cover 312 includes sixth pillar portions 331F, 331M, and 331R protruding toward the inside of the printer body 350, that is, toward the left cover 311 in the second direction D2. The left cover 311 and the right cover 312 are made of a resin material.

As illustrated in FIG. 24B, the operator assembles the left cover 311 and the right cover 312 to the frame body 301. Then, as illustrated in FIG. 24B, the third pillar portion 330F and the sixth pillar portion 331F are arranged in the space S30, the third pillar portions 330M and 330R are arranged in the space S21, and the sixth pillar portions 331M and 331R are arranged in the space S22. As a result, the third pillar portions 330F, 330M, and 330R of the left cover 311 and the sixth pillar portions 331F, 331M, and 331R of the right cover 312 form a part of a pillar structure to be described later.

As illustrated in FIG. 25A, on the left side of the back surface portion of the printer 300, the third pillar portion 330R is disposed between the first pillar portion 334R and the second pillar portion 332R in the vertical direction D3, and can come into contact with the first pillar portion 334R and the second pillar portion 332R. In addition, the third pillar portion 330R is provided at a position at least partially overlapping the first pillar portion 334R and the second pillar portion 332R as viewed in the vertical direction D3. The first pillar portion 334R, the second pillar portion 332R, and the third pillar portion 330R form a pillar structure PL7 of the left rear portion of the casing 360.

Similarly, on the right side of the back surface portion of the printer 300, the sixth pillar portion 331R is disposed between the fourth pillar portion 335R and the fifth pillar portion 333R in the vertical direction D3, and can come into contact with the fourth pillar portion 335R and the fifth pillar portion 333R. In addition, the sixth pillar portion 331R is provided at a position at least partially overlapping the fourth pillar portion 335R and the fifth pillar portion 333R as viewed in the vertical direction D3. The fourth pillar portion 335R, the fifth pillar portion 333R, and the sixth pillar portion 331R form a pillar structure PL8 at the right rear part of the casing 360.

The pillar structures PL7 and PL8 form a part of the structure of the printer body 350, and can receive an external force particularly in the vertical direction D3 when the external force acts on the back surface portion of the printer body 350. For example, the load acting on the fourth pillar portion 335R from above can be received by the fifth pillar portion 333R via the sixth pillar portion 331R, and the load can be dispersed throughout the casing 360.

In addition, the third pillar portion 330R and the sixth pillar portion 331R are engaged with the frame body 301 in the second direction D2, and a part of the third pillar portion 330R, the sixth pillar portion 331R, and the frame body 301 form a pillar structure PL9R. Similarly, as illustrated in FIG. 25B, the third pillar portion 330M and the sixth pillar portion 331R are engaged with the frame body 301 in the second direction D2, and the third pillar portion 330M, the sixth pillar portion 331M, and a part of the frame body 301 form a pillar structure PL9M. The pillar structures PL9R and PL9M form a part of the structure of the printer body 350, and can receive an external force particularly in the second direction D2 when the external force acts on the printer body 350.

In the present exemplary embodiment, the third pillar portions 330M and 330R and the sixth pillar portions 331M and 331R are engaged with the frame body 301 in the second direction D2, but the present invention is not limited thereto. For example, the third pillar portions 330M and 330R and the sixth pillar portions 331M and 331R may be engaged with the feeding frame 303 or the bottom frame 304 in the second direction D2 to form the pillar structures PL9M and PL9R.

As illustrated in FIG. 25C, on the left side of the front surface portion of the printer 300, the third pillar portion 330F is disposed between the first pillar portion 334F and the second pillar portion 332F in the vertical direction D3, and can come into contact with the first pillar portion 334F and the second pillar portion 332F. In addition, the third pillar portion 330F is provided at a position at least partially overlapping the first pillar portion 334F and the second pillar portion 332F as viewed in the vertical direction D3. The first pillar portion 334F, the second pillar portion 332F, and the third pillar portion 330F form a pillar structure PL10 at the left front portion of the casing 360.

Similarly, on the right side of the front surface portion of the printer 300, the sixth pillar portion 331F is disposed between the fourth pillar portion 335F and the fifth pillar portion 333F in the vertical direction D3, and can come into contact with the fourth pillar portion 335F and the fifth pillar portion 333F. In addition, the sixth pillar portion 331F is provided at a position at least partially overlapping the fourth pillar portion 335F and the fifth pillar portion 333F as viewed in the vertical direction D3. The fourth pillar portion 335F, the fifth pillar portion 333F, and the sixth pillar portion 331F form a pillar structure PL11 at the right front portion of the casing 360.

The pillar structures PL10 and PL11 form a part of the structure of the printer body 350, and can receive an external force particularly in the vertical direction D3 when the external force acts on the front surface portion of the printer body 350. For example, the load acting on the fourth pillar portion 335F from above can be received by the fifth pillar portion 333F via the sixth pillar portion 331F, and the load can be dispersed throughout the casing 360.

As illustrated in FIGS. 24A to 27B, the first pillar portions 334F and 334R, the second pillar portions 332F and 332R, and the third pillar portions 330F, 330M, and 330R are disposed on the side opposite to the photosensitive drum 44 (see FIG. 13) with respect to the side plate 301*a* in the second direction D2. Similarly, the fourth pillar portions 335F and 335R, the fifth pillar portions 333F and 333R, and the sixth pillar portions 331F, 331M, and 331R are disposed on the side opposite to the photosensitive drum 44 (see FIG. 13) with respect to the side plate 301*b* in the second direction D2. Further, the first pillar portion 334F, the second pillar portion 332F, the third pillar portion 330F, the fourth pillar portion 335F, the fifth pillar portion 333F, and the sixth pillar portion 331F are disposed downstream of the side plates 301*a* and 301*b* in the first direction D1.

Further, as illustrated in FIGS. 26A and 26B, the front cover 313 which is a part of the casing 360 is provided with a seventh pillar portion 336. The third pillar portion 330F and the sixth pillar portion 331F are engaged with the seventh pillar portion 336 of the front cover 313 in the second direction D2, and the third pillar portion 330F, the sixth pillar portion 331F, and the seventh pillar portion 336 form a pillar structure PL12. The pillar structure PL12 forms a part of the structure of the printer body 350, and can receive an external force particularly in the second direction D2 when the external force acts on the printer body 350.

Effects of Third Exemplary Embodiment

In the present exemplary embodiment, the left cover 311 and the right cover 312, which are parts of the exterior of the casing 360 of the printer 300, are used as parts of the pillar structures PL7, PL8, PL9M, PL9R, PL10, PL11, and PL12, which are structures of the printer body 350. The first pillar portions 334F and 334R, the fourth pillar portions 335F and 335R, the second pillar portions 332F and 332R, and the fifth pillar portions 333F and 333R extend toward the outside of the printer body 250 in the second direction D2. The first pillar portion 334F, the second pillar portion 332F, the fourth pillar portion 335F, and the fifth pillar portion 333F extend downstream of the side plates 301*a* and 301*b* of the frame body 301 in the first direction D1.

For example, a case where a frame body for a single-function printer is shared with a frame body for a multi-function printer having a larger product size in the first direction D1 and the second direction D2 than that of a single-function printer will be considered. At this time, with respect to the frame body for the single-function printer, the first pillar portions 334F and 334R and the fourth pillar portions 335F and 335R are added to the side plates 301*a* and 301*b* of the frame body, and the feeding frame 303 and the bottom frame 304 are added. As described above, a part of the left cover 311 and a part of the right cover 312 made of a resin material are used as a part of the pillar structures PL7, PL8, PL9M, PL9R, PL10, PL11, and PL12. Therefore, it is possible to realize weight reduction and cost reduction of the printer 300 while securing stiffness of the printer 300.

First Modification of Third Exemplary Embodiment

In the third exemplary embodiment, the first pillar portions 334F and 334R and the fourth pillar portions 335F and 335R are provided in the frame body 301, but the present invention is not limited thereto. For example, in a first modification of the third exemplary embodiment, the top cover 310 illustrated in FIG. 22 may be attached to an upper portion of the frame body 301. That is, first pillar portions 334F and 334R and fourth pillar portions 335F and 335R may be provided in top cover 310 instead of frame body 301.

Second Modification of Third Exemplary Embodiment

Figure 28A:
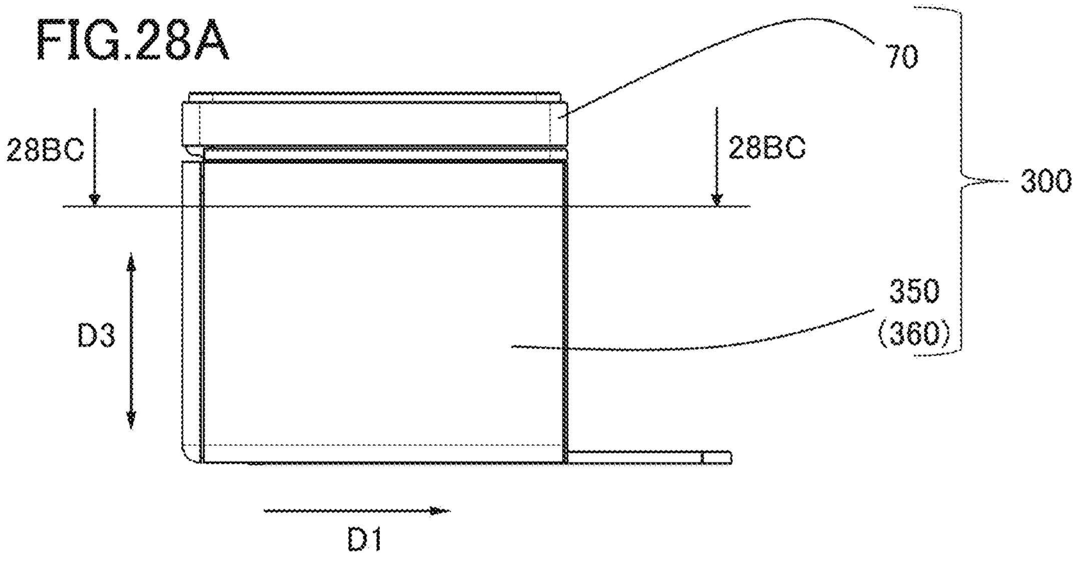
FIG. 28A is a side view illustrating a left side surface of a printer according to a second modification of the third exemplary embodiment.
Figure 28B:
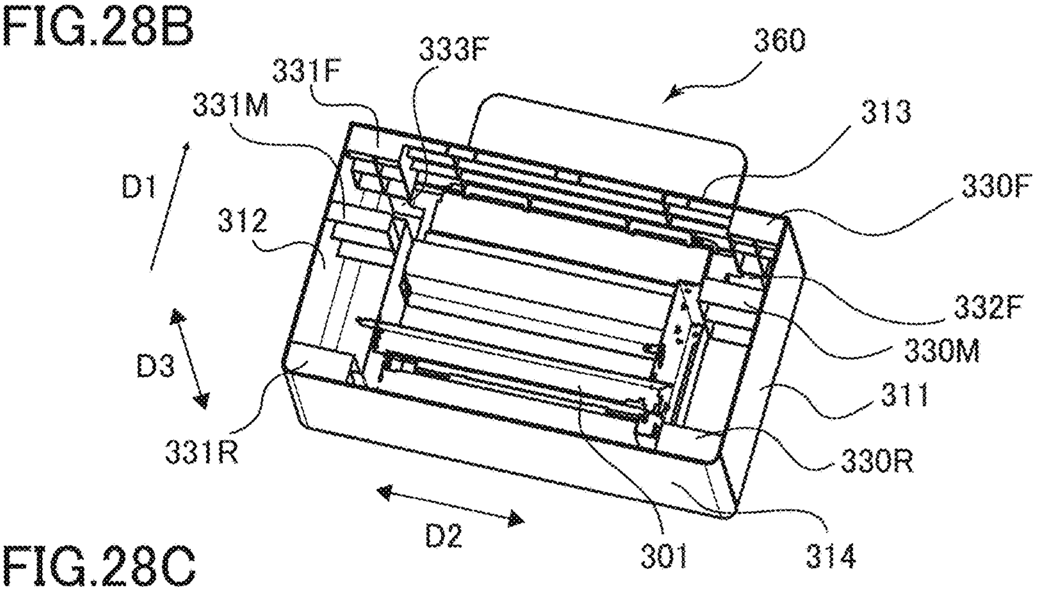
FIG. 28B is a perspective view illustrating a casing according to the second modification of the third exemplary embodiment.
Figure 28C:
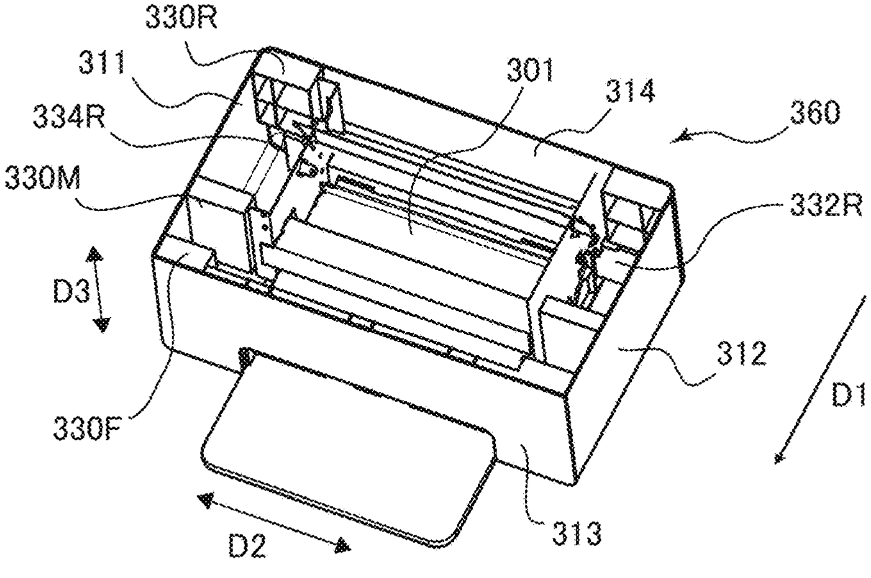
FIG. 28C is another perspective view illustrating the casing according to the second modification of the third exemplary embodiment.
Figure 29A:
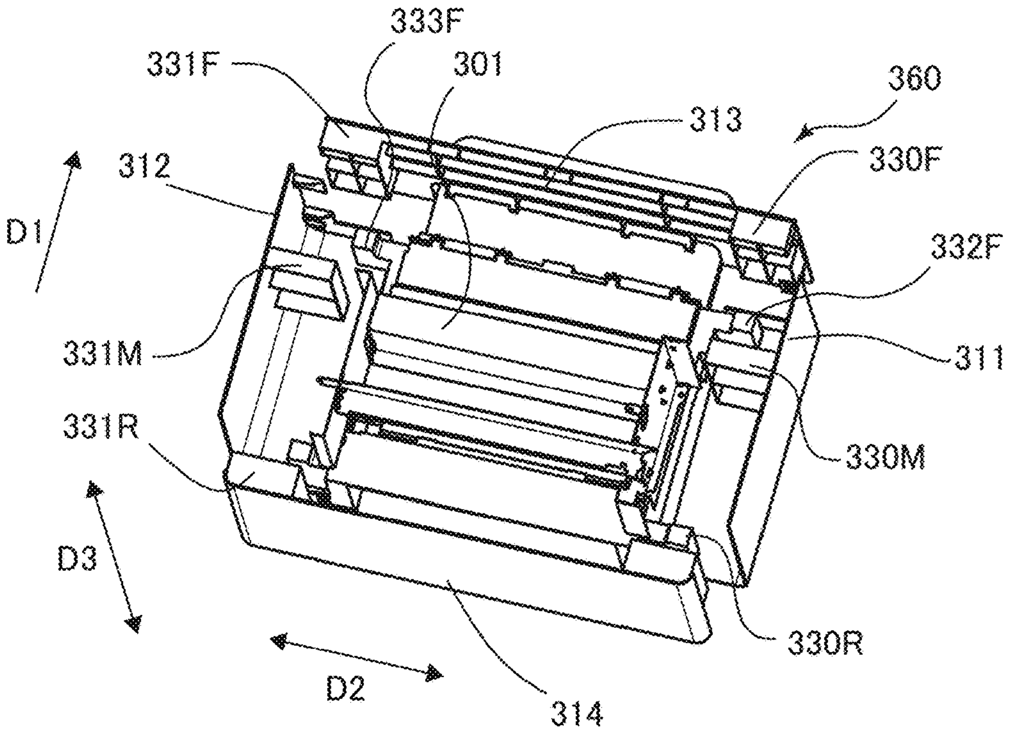
FIG. 29A is an exploded perspective view illustrating a casing according to a second modification of the third exemplary embodiment.
Figure 29B:
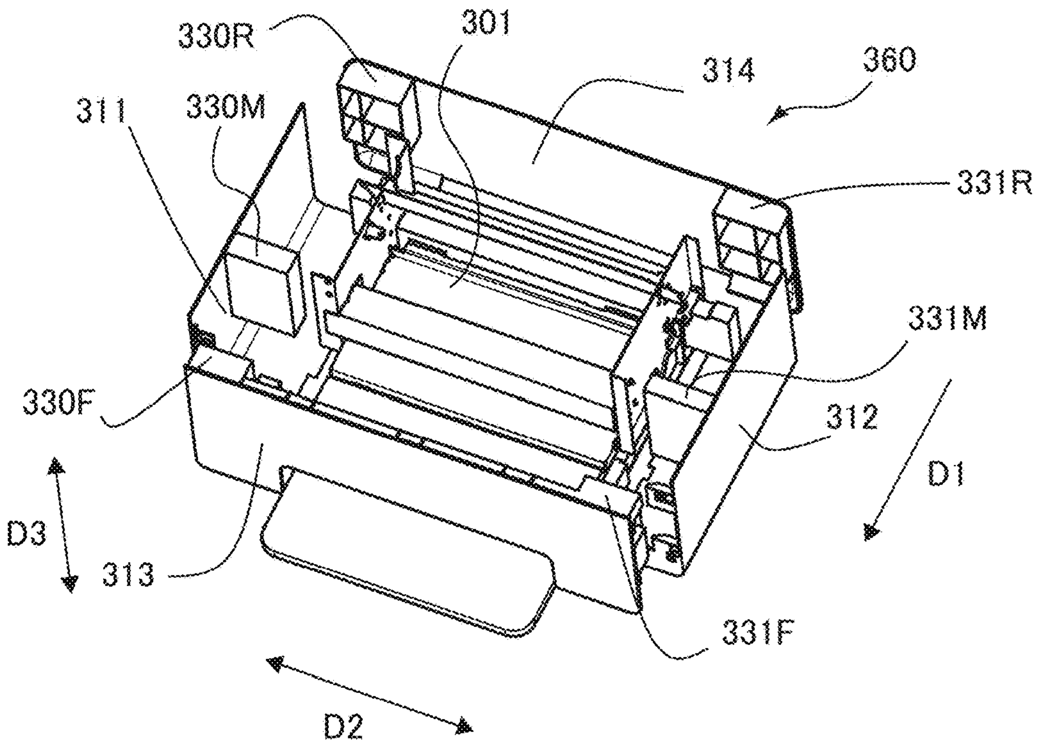
FIG. 29B is another perspective view illustrating the casing according to the second modification of the third exemplary embodiment.

In the third exemplary embodiment, the third pillar portions 330F and 330R and the sixth pillar portions 331F and 331R are provided in the left cover 311 and the right cover 312, but the present invention is not limited thereto. FIG. 28A is a side view illustrating a left side surface of a printer 300 according to a second modification, FIG. 28B is a perspective view illustrating a casing 360 according to the second modification, and FIG. 28C is another perspective view illustrating the casing 360 according to the second modification. FIG. 29A is an exploded perspective view illustrating a casing 360 according to a second modification, and FIG. 29B is another perspective view illustrating the casing 360 according to the second modification.

For example, in the second modification of the third exemplary embodiment, the front cover 313 and the rear cover 214 illustrated in FIGS. 28BC and 29AB may be attached to the front and rear of the frame body 301. FIG. 28A is a side view illustrating a left side surface of a printer 300 according to a second modification. FIGS. 28B and 28C are perspective views illustrating the casing 360 cut along line 28BC-28BC in FIG. 28A. FIGS. 29A and 29B are exploded perspective views illustrating the casing 360 cut along line 28BC-28BC of FIG. 28A.

As illustrated in FIGS. 28B and 28C and FIGS. 29A and 29B, the front cover 313 has a third pillar portion 330F and a sixth pillar portion 331F. The rear cover 314 includes a third pillar portion 330R and a sixth pillar portion 331R. That is, instead of the left cover 311 and the right cover 312, the third pillar portions 330F and 330R and the sixth pillar portions 331F and 331R may be provided on the front cover 313 and the rear cover 314. At this time, the left cover 311 as the fourth side cover is provided with a third pillar portion 330M as a third engagement portion engaged with the side plate 301*a*, the feeding frame 303, or the bottom frame 304 in the second direction D2. In addition, the right cover 312 is provided with a sixth pillar portion 331M that engages with the side plate 301*b*, the feeding frame 303, or the bottom frame 304 in the second direction D2.

Other Embodiments

In the first exemplary embodiment, the pillar structures PL1 and PL2 are provided at the left front portion and the right front portion of the printer body 50, respectively, but the present invention is not limited thereto. For example, the pillar structures PL1 and PL2 may be provided at the left rear portion and the right rear portion of the printer body 50, respectively, and the arrangement thereof is not limited.

Further, in the first exemplary embodiment, the pillar 17 is provided separately from the side plate 1*a*, but may be formed integrally with the side plate 1*a*.

In any of the exemplary embodiments described above, the electrophotographic printer has been described, but the present invention is not limited thereto. For example, the present invention can also be applied to an inkjet-type image forming apparatus that forms an image on a sheet by ejecting ink liquid from a nozzle. For example, in an inkjet printer, a print head is accommodated inside the frame body 1. The print head ejects ink to the recording material while moving in the second direction D2 along the head guide suspended on the side plates 1*a* and 1*b* of the frame body 1.

In any of the exemplary embodiments described above, the left cover and the right cover are formed to extend along the discharge direction DD and the vertical direction D3, but the present invention is not limited thereto. For example, the left cover and the right cover may be formed to extend along the pull-out direction and the vertical direction D3 of the cassette that accommodates sheets.

In any of the exemplary embodiments described above, the bottom frame and the feeding frame are made of a resin material, but the present invention is not limited thereto. For example, the bottom frame and the feeding frame may be made of a metal material such as a sheet metal. The first pillar portion and the second pillar portion provided in the frame body may also be made of a metal material such as a sheet metal. In this case, the first pillar portion and the second pillar portion may be provided integrally with or separately from the side plate of the frame body.

In addition, the above-described exemplary embodiments and modifications may be arbitrarily combined. In addition, each of the pillar portions of the above-described exemplary embodiments preferably has a size of at least about several centimeters in the vertical direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-199698, filed Dec. 9, 2021, and Japanese Patent Application No. 2022-160180, filed Oct. 4, 2022, which are hereby incorporated by reference herein in their entirety.

What is claimed is:

1. An image forming apparatus comprising:

an image forming unit including an image bearing member which bears an image, the image forming unit being configured to form the image on a sheet; and a casing in which the image forming unit is accommodated and on which a discharge port is formed, the discharge port being configured to discharge the sheet on which the image is formed by the image forming unit, the casing including a first frame, a second frame, a side cover forming one side surface of the casing, and a top cover forming a top surface of the casing, wherein at least one of the top cover or the first frame includes a supported portion, wherein the second frame includes a first support portion disposed below the supported portion, and wherein the side cover includes a second support portion disposed between the supported portion and the first support portion in a vertical direction, the second support portion being configured to support the supported portion, wherein the first support portion supports the second support portion in the vertical direction, wherein the second support portion is provided at a position at least partially overlapping with the supported portion and the first support portion as viewed in the vertical direction, and wherein the first frame includes:

a side plate that supports an end, in a longitudinal direction, of the image bearing member; and an extension member fixed to the side plate, the extension member extending more downstream than the side plate in a direction that intersects with the vertical direction, wherein the extension member forms at least a part of the supported portion and is configured to be supported by the second support portion.

2. The image forming apparatus according to claim 1, wherein the first support portion is configured to receive a load acting on the supported portion from above via the second support portion.

3. The image forming apparatus according to claim 1, wherein a length of the second frame in the vertical direction is shorter than a length of the first frame in the vertical direction.

4. The image forming apparatus according to claim 1, wherein:

the side plate is made of a metal material, and the side cover is made of a resin material.

5. The image forming apparatus according to claim 4, wherein the supported portion and the second frame are made of a resin material.

6. The image forming apparatus according to claim 4, wherein:

the supported portion is made of a resin material, and the second frame is made of a metal material.

7. The image forming apparatus according to claim 1, wherein the first support portion is disposed at a position at least partially overlapping with the supported portion as viewed in the vertical direction.

8. The image forming apparatus according to claim 1, wherein the first support portion is disposed at a position not overlapping with the supported portion as viewed in the vertical direction.

9. The image forming apparatus according to claim 1, wherein:

the second frame extends more downstream than the side plate in the discharge direction, and the first support portion is disposed right below the extension member.

10. The image forming apparatus according to claim 1, wherein the supported portion, the first support portion, and the second support portion are disposed so as to overlap with the side plate in the longitudinal direction of the image bearing member.

11. The image forming apparatus according to claim 1, wherein the supported portion, the first support portion, and the second support portion are disposed on a side opposite to the image bearing member with respect to the side plate in the longitudinal direction of the image bearing member.

12. The image forming apparatus according to claim 1, wherein the supported portion, the first support portion, and the second support portion are disposed on a side opposite to the image bearing member with respect to the side plate in the longitudinal direction of the image bearing member, and disposed downstream of the side plate in a discharge direction in which the sheet is discharged from the discharge port.

13. The image forming apparatus according to claim 1, wherein the top cover forms the supported portion and is configured to come into contact with the second support portion.

14. The image forming apparatus according to claim 1, wherein the side cover is a cover that extends along a discharge direction in which the sheet is discharged from the discharge port and the vertical direction, and covers the side plate.

15. The image forming apparatus according to claim 14, wherein the second support portion engages with the side plate or the second frame in the longitudinal direction of the image bearing member.

16. The image forming apparatus according to claim 14, wherein:

the side cover is a first side cover, the supported portion is a first supported portion, the casing includes a second side cover that extends along the discharge direction and the vertical direction and forms a side surface opposite to the one side surface of the casing in the longitudinal direction of the image bearing member, at least one of the top cover or the first frame includes a second supported portion, the second frame includes a third support portion disposed below the second supported portion, the second side cover includes a fourth support portion disposed between the second supported portion and the third support portion in the vertical direction, the fourth support portion being configured to support the second supported portion, the third support portion supports the fourth support portion in the vertical direction, and the fourth support portion is provided at a position at least partially overlapping with the second supported portion and the third support portion when viewed in the vertical direction.

17. The image forming apparatus according to claim 16, wherein:

the first supported portion, the first support portion, and the second support portion are disposed on a first end side in the longitudinal direction of the casing, and the second supported portion, the third support portion, and the fourth support portion are disposed on a second side in the longitudinal direction of the casing.

18. The image forming apparatus according to claim 17, wherein the second support portion and the fourth support portion are engaged with the side plate or the second frame in the longitudinal direction of the image bearing member.

19. The image forming apparatus according to claim 17, wherein:

the casing includes a third side cover extending along the longitudinal direction and the vertical direction, and the third side cover includes a first engagement portion and a second engagement portion, and connects the first side cover and the second side cover, the first engagement portion being engaged with the second support portion, the second engagement portion being engaged with the fourth support portion.

20. The image forming apparatus according to claim 19, wherein the first engagement portion and the second engagement portion are disposed at substantially the same height in the vertical direction.

21. The image forming apparatus according to claim 19, wherein the third side cover has a rib extending in the longitudinal direction.

22. The image forming apparatus according to claim 1, wherein the side cover is a cover that extends along the longitudinal direction and the vertical direction of the image bearing member and is disposed downstream of the image bearing member in a discharge direction in which the sheet is discharged from the discharge port.

23. The image forming apparatus according to claim 22, wherein:

the casing includes a fourth side cover extending along the discharge direction and the vertical direction, the fourth side cover covering the side plate, and the fourth side cover includes a third engagement portion that engages with the side plate or the second frame in the longitudinal direction.

24. The image forming apparatus according to claim 22, wherein:

the supported portion is a first supported portion, at least one of the top cover or the first frame includes a second supported portion, the second frame includes a third support portion disposed below the second supported portion, the side cover includes a fourth support portion disposed between the second supported portion and the third support portion in the vertical direction, the fourth support portion being configured to support the second supported portion, the third support portion supports the fourth support portion in the vertical direction, and the fourth support portion is provided at a position at least partially overlapping with the second supported portion and the third support portion when viewed in the vertical direction.

25. The image forming apparatus according to claim 24, wherein:

the first supported portion, the first support portion, and the second support portion are disposed on a first end side in the longitudinal direction of the casing, and the second supported portion, the third support portion, and the fourth support portion are disposed on a second end side in the longitudinal direction of the casing.

26. The image forming apparatus according to claim 1, wherein the side cover is a cover that extends along the longitudinal direction and the vertical direction of the image bearing member and is disposed upstream of the image bearing member in a discharge direction in which the sheet is discharged from the discharge port.

27. The image forming apparatus according to claim 26, wherein:

the casing includes a fourth side cover extending along the discharge direction and the vertical direction, the fourth side cover covering the side plate, and the fourth side cover includes a third engagement portion that engages with the side plate or the second frame in the longitudinal direction.

28. The image forming apparatus according to claim 26, wherein:

the supported portion is a first supported portion, at least one of the top cover or the first frame includes a second supported portion, the second frame includes a third support portion disposed below the second supported portion, the side cover includes a fourth support portion disposed between the second supported portion and the third support portion in the vertical direction, the fourth support portion being configured to support the second supported portion, the third support portion supports the fourth support portion in the vertical direction, and the fourth support portion is provided at a position at least partially overlapping with the second supported portion and the third support portion when viewed in the vertical direction.

29. The image forming apparatus according to claim 28, wherein:

the first supported portion, the first support portion, and the second support portion are disposed on a first end side in the longitudinal direction of the casing, and the second supported portion, the third support portion, and the fourth support portion are disposed on a second end side in the longitudinal direction of the casing.

30. The image forming apparatus according to claim 1, further comprising an image reading apparatus disposed above the casing and configured to read an image on a sheet.

* * * * *